(12) United States Patent
Zhang et al.

(10) Patent No.: US 12,377,343 B2
(45) Date of Patent: Aug. 5, 2025

(54) PUZZLE PLATFORM

(71) Applicant: Shenzhen Shi Hu Lian Heng Tong Trading Co. Ltd., Guangdong (CN)

(72) Inventors: Meng Zhang, Guangdong (CN); Xiaoling Che, Hubei (CN)

(73) Assignee: Shenzhen Shi Hu Lian Heng Tong Trading Co. Ltd., Shenzhen (CN)

( * ) Notice: Subject to any disclaimer, the term of this patent is extended or adjusted under 35 U.S.C. 154(b) by 0 days.

(21) Appl. No.: 18/783,453

(22) Filed: Jul. 25, 2024

(65) Prior Publication Data

US 2024/0374989 A1    Nov. 14, 2024

Related U.S. Application Data

(63) Continuation-in-part of application No. 18/748,158, filed on Jun. 20, 2024, which is a continuation of application No. 18/530,402, filed on Dec. 6, 2023, now Pat. No. 12,053,709, which is a continuation-in-part of application No. 17/829,359, filed on Jun. 1, 2022, now Pat. No. 12,104,744, said
(Continued)

(30) Foreign Application Priority Data

Sep. 26, 2021 (CN) .......................... 202111131554.1
Sep. 26, 2021 (CN) .......................... 202122334815.1
Jun. 13, 2023 (CN) .......................... 202330364018.X
Apr. 18, 2024 (CN) .......................... 202430220715.2
May 23, 2024 (CN) .......................... 202430309522.4
Jun. 19, 2024 (CN) .......................... 202430377406.6

(51) Int. Cl.
*A63F 9/00* (2006.01)
*A63F 3/00* (2006.01)
*A63F 9/10* (2006.01)
*A47B 25/00* (2006.01)

(52) U.S. Cl.
CPC ........ *A63F 9/1044* (2013.01); *A63F 3/00261* (2013.01); *A47B 25/00* (2013.01); *A63F 2003/00274* (2013.01); *A63F 2003/00952* (2013.01)

(58) Field of Classification Search
CPC ................ A63F 9/1044; A63F 3/00621; A63F 2003/00274; A63F 2003/00952; A47B 23/00; B43L 1/00; B43L 13/005
USPC ...................................................... 273/153 R
See application file for complete search history.

(56) References Cited

U.S. PATENT DOCUMENTS 636,663 A * 11/1899 Harrison ............. A63F 3/00895
273/284
5,409,383 A * 4/1995 Mannino ................... B43L 1/00
434/408

(Continued)

*Primary Examiner* — Nkeisha Smith

(57) ABSTRACT

A puzzle platform includes a puzzle plate, an upper part detachably connected to the puzzle plate to form a workspace for placing a plurality of puzzle pieces, a reinforcing assembly supporting the puzzle plate for forming a receiving space cooperatively with the puzzle board, at least two puzzle drawers retained in the receiving space, and a complementary conformation provided between the upper part and the puzzle plate for fixing the upper part on the puzzle plate. The upper part and the reinforcing assembly are positioned on opposite sides of the puzzle plate and the reinforcing assembly is integral with the puzzle plate as a whole, simplifying the manufacturing process and reducing costs.

28 Claims, 24 Drawing Sheets

Related U.S. Application Data application No. 18/748,158 is a continuation-in-part of application No. 18/235,416, filed on Aug. 18, 2023, now Pat. No. 12,059,631, and a continuation-in-part of application No. 18/235,896, filed on Aug. 21, 2023, now Pat. No. 12,048,885, which is a continuation-in-part of application No. 17/829,359, filed on Jun. 1, 2022, now Pat. No. 12,104,744, said application No. 18/235,416 is a continuation-in-part of application No. 17/829,359, filed on Jun. 1, 2022, now Pat. No. 12,104,744, said application No. 18/748,158 is a continuation-in-part of application No. 17/829,359, filed on Jun. 1, 2022, now Pat. No. 12,104,744, application No. 18/783,453, filed on Jul. 25, 2024 is a continuation-in-part of application No. 18/737,905, filed on Jun. 7, 2024, which is a continuation of application No. 18/235,896, filed on Aug. 21, 2023, now Pat. No. 12,048,885, and a continuation of application No. 18/235,416, filed on Aug. 18, 2023, now Pat. No. 12,059,631, and a continuation-in-part of application No. 17/829,359, filed on Jun. 1, 2022, now Pat. No. 12,104,744, and a continuation-in-part of application No. 18/541,685, filed on Dec. 15, 2023, now Pat. No. 12,042,740, which is a continuation of application No. 17/505,587, filed on Oct. 19, 2021, now Pat. No. 11,890,551, said application No. 18/235,416 is a continuation-in-part of application No. 17/505,587, filed on Oct. 19, 2021, now Pat. No. 11,890,551, said application No. 18/235,896 is a continuation-in-part of application No. 17/505,587, filed on Oct. 19, 2021, now Pat. No. 11,890,551, application No. 18/783,453, filed on Jul. 25, 2024 is a continuation-in-part of application No. 18/736,862, filed on Jun. 7, 2024, now Pat. No. 12,220,648, which is a continuation of application No. 18/235,896, filed on Aug. 21, 2023, now Pat. No. 12,048,885, and a continuation of application No. 18/235,416, filed on Aug. 18, 2023, now Pat. No. 12,059,631, and a continuation-in-part of application No. 17/829,359, filed on Jun. 1, 2022, now Pat. No. 12,104,744, application No. 18/783,453, filed on Jul. 25, 2024 is a continuation-in-part of application No. 18/732,602, filed on Jun. 3, 2024, now Pat. No. 12,186,676, which is a continuation of application No. 18/541,685, filed on Dec. 15, 2023, now Pat. No. 12,042,740, application No. 18/783,453, filed on Jul. 25, 2024 is a continuation-in-part of application No. 17/829,359, filed on Jun. 1, 2022, now Pat. No. 12,104,744.

(56) References Cited

U.S. PATENT DOCUMENTS

| | | | |
|---|---|---|---|
| 6,776,414 B1* | 8/2004 | Messac | A63F 3/00214 |
| | | | 273/284 |
| 2017/0087454 A1* | 3/2017 | Reichmuth | A63F 3/02 |
| 2023/0293979 A1* | 9/2023 | Che | A47B 19/08 |
| | | | 108/59 |

* cited by examiner

PUZZLE PLATFORM

CROSS REFERENCES AND PRIORITIES

This application is a continuation-in-part of U.S. patent application Ser. No. 17/829,359 filed on Jun. 1, 2022;
 a continuation-in-part of U.S. patent application Ser. No. 18/748,158 filed on Jun. 20, 2024;
 a continuation-in-part of U.S. patent application Ser. No. 18/736,862 filed on Jun. 7, 2024;
 a continuation-in-part of U.S. patent application Ser. No. 18/737,905 filed on Jun. 7, 2024; and
 a continuation-in-part of U.S. patent application Ser. No. 18/732,602 filed on Jun. 3, 2024.

This application also claims the benefit of Chinese Design Patent application No. 202430220715.2 filed on Apr. 18, 2024, Chinese Design Patent application No. 202430377406.6 filed on Jun. 19, 2024, and Chinese Design Patent Application No. 202430309522.4 filed on May 23, 2024.

Each of the above-identified applications or patent is hereby incorporated herein by reference in its entirety.

BACKGROUND OF THE PRESENT INVENTION

Field of Invention

The present invention relates to puzzle game apparatus, and more particularly to a puzzle platform, wherein the puzzle platform is configured for retaining all the unfinished pieces and while allowing the player to conveniently play the puzzle.

Description of Related Arts

Puzzles are devised over the years and are among the most popular board games generally played alone by an individual. It is well known that puzzles are good for the brain. Studies have shown that playing puzzles can improve cognition and visual-spatial reasoning, and can train concentration and patience.

Other than as a means of entertainment and enjoyment, players would like to challenge themselves by playing higher piece counts of the puzzle. Generally speaking, the higher the piece count, the harder the puzzle is. However, a common drawback or a burden for the player is that the finished size of the puzzles is relatively large. For example, a finished size of 1,000 piece puzzles is about 30"×24", a finished size of 5,000 piece puzzles is about 60"×40", and so on. It could take hours, days or even months to compete a larger scale puzzle. One or more puzzle pieces could be missed accidentally or unintentionally. It is sad that the player usually finds out there is a missing piece at the end. Furthermore, as a skilled player, the strategies for playing such huge size of puzzles are configured for classifying puzzle pieces by different feature such as puzzle pieces with a particular color or shape and preassembling a group of puzzle pieces. Therefore, how to avoid losing any pieces and classifying different puzzle pieces with preassembling puzzle groups, it is best to find a container to save and classify all the unfinished pieces.

U.S. Pub. No. US20210170267A1 describes a jigsaw puzzle on which the puzzle pieces are assembled. Referring to FIG. 2, a perimeter edge 18 and a first side edge 22 is a type of two-piece and a multi-layer structure. The perimeter edge 18 is stacked on the first side edge 22 and a drawer 40 positioned such that it is extendable outwardly away from the first side edge 22. In order to assemble the drawer 40, the perimeter edge 18 and the first side edge 22 should be placed at an appropriate location. However, in order to place the perimeter edge 18 and the first side edge 22 precisely at specific location, the locations of the perimeter edge 18 and the first side edge 22 should be adjusted repeatedly. So, the perimeter edge 18 and a first side edge 22 must be assembled together by additional assembly steps, which complicates the manufacturing process. Therefore, the jigsaw puzzle has complicated structures and is difficult to be manufactured with low cost.

A need exists for a tool that retains all the unfinished pieces classified. It is to the provision of such a tool that the present disclosure is primarily directed.

SUMMARY OF THE PRESENT INVENTIONS

The invention is advantageous in that it provides a puzzle platform, wherein the puzzle platform is configured for allowing a player to classify and store unfinished puzzles in the process of playing puzzles. The puzzle platform includes a puzzle plate, an upper part detachably connected to the puzzle plate to form a workspace for placing a plurality of puzzle pieces, a reinforcing assembly supporting the puzzle plate for forming a receiving space cooperatively with the puzzle board, at least two puzzle drawers retained in the receiving space, respectively and a complementary conformation provided between the upper part and the puzzle plate for fixing the upper part on the puzzle plate. The upper part and the reinforcing assembly are positioned on opposite sides of the puzzle plate. The reinforcing assembly is integral with the puzzle plate as a whole.

Optionally, the complementary conformation comprises a plurality of fastening holes drilled completely through the puzzle plate and a plurality of fastening hooks provided on the upper part passed through corresponding fastening holes for fastening the upper part to the puzzle plate.

Optionally, the complementary conformation comprises a plurality of first thread holes provided on the puzzle plate, a plurality of second thread holes provided on the upper part and a plurality of fastening screw passed through a corresponding first and second thread holes for fixing the upper part on the puzzle plate.

Optionally, the upper part comprises a first extending wall extending upwardly from the puzzle plate, a second extending wall extending upwardly from the puzzle plate, spaced apart from the first extending wall, and a third extending wall extending upwardly from the puzzle plate and connected with the first and second extending walls. The puzzle plate, and the first, second and third extending walls form the workspace for containing the puzzle pieces.

Optionally, the upper part is an integral unit.

Optionally, the third extending wall is detachably connected to the first and second extending walls.

Optionally, the outline of the upper part is rectangular with rounded corners.

Optionally, the upper part comprises an outer wall mounted on the puzzle plate, an inner wall opposite to the outer wall, and an upper wall connected with the outer and inner walls.

Optionally, the upper part further comprises an upper space surrounded by the upper wall together with the outer and inner walls, the fastening hooks are spacedly extended from the upper wall and protruded from the upper space.

Optionally, the upper part further comprises an upper space surrounded by the upper wall together with the outer and inner walls, and a plurality of reinforcing parts provided in the upper space for preventing the distortion or deformation of the upper part.

Optionally, a joining portion of the upper wall and the outer wall is curved.

Optionally, the periphery of the reinforcing assembly comprises a connecting wall connected to the puzzle plate, a step portion extending downwardly from the connecting wall along a direction away from the center of the puzzle plate, and a supporting wall extending downwardly from the step portion.

Optionally, the outline of the upper part is substantially the same as that of the connecting wall.

Optionally, the reinforcing assembly includes a first main supporting wall integrally extended downwardly from the puzzle plate, a second main supporting wall integrally extended downwardly from the puzzle plate, and a first dividing supporting wall integrally extended downwardly from the puzzle plate and disposed between the first and second main supporting walls. The puzzle plate, the first dividing supporting wall, and the first and second main supporting walls form a one-piece structure, and the first dividing supporting wall is cooperated with the first and second main supporting walls for securing the puzzle drawers.

Optionally, the reinforcing assembly further comprises a first inner supporting wall integrally extended downwardly from the puzzle plate and connected with the first and second main supporting walls, and the first inner supporting wall is also connected with the first dividing supporting wall for forming a one-piece structure cooperated with the puzzle plate, the first dividing supporting wall, and the first and second main supporting walls.

Optionally, the complementary conformation comprises a protruding portion protruding from the puzzle plate and a fixing groove provided on the upper part and engaged with the protruding portion for fixing the upper part on the puzzle board firmly.

Optionally, the first main supporting wall comprises at least one limiting bar, and a corresponding puzzle drawer comprises at least one limiting groove matching with the limiting bar.

Optionally, at least one puzzle drawer comprises a rectangular bottom panel, a front panel extending from the bottom panel, a back panel extending from the bottom panel and opposite to the front panel, and a pair of side panels extending from the bottom panel for connected with the front panel, and the back panel, the front panel, the back panel, and the pair of side panels form a one-piece structure In another aspect, the present invention provides another puzzle platform including a puzzle plate, an upper part integrally extended upwardly from the puzzle plate to form a one-piece structure, a reinforcing assembly supporting the puzzle plate for forming a receiving space cooperatively with the puzzle board, at least two puzzle drawers retained in the receiving space, respectively, and a complementary conformation provided between the reinforcing assembly and the puzzle plate for fixing the reinforcing assembly on the puzzle plate. The upper part and the reinforcing assembly are positioned at two sides of the puzzle plate. At least a portion of the reinforcing assembly is detachably connected to the puzzle plate.

Optionally, the complementary conformation comprises a plurality of fastening holes drilled completely through the puzzle plate and a plurality of fastening hooks provided on the reinforcing assembly passed through corresponding fastening holes for fastening the reinforcing assembly to the puzzle plate.

Optionally, the complementary conformation comprises a plurality of fastening holes provided on the reinforcing assembly and a plurality of fastening hooks provided on the puzzle plate and passed through corresponding fastening holes for fastening the reinforcing assembly to the puzzle plate.

Optionally, the complementary conformation comprises a plurality of first thread holes provided on the puzzle plate, a plurality of second thread holes provided on the reinforcing assembly, and a plurality of fastening screws passed through corresponding first and second thread holes for fixing the reinforcing assembly on the puzzle plate.

Optionally, wherein the puzzle plate and the upper part are made of plastic.

Optionally, the reinforcing assembly comprises a first main supporting wall detachably connected to the puzzle plate, and a second main supporting wall detachably connected to the puzzle plate and spaced apart from the first main supporting wall.

Optionally, the reinforcing assembly further comprises a first dividing supporting wall detachably connected to the puzzle plate and disposed between the first and second main supporting walls, and the first dividing supporting wall is cooperated with the first and second main supporting walls for securing the puzzle drawers.

Optionally, the reinforcing assembly further comprises a first inner supporting wall integrally extended downwardly from the puzzle plate and connected with the first and second main supporting walls, the first inner supporting wall and the puzzle plate form a one-piece structure.

Optionally, the reinforcing assembly further comprises a first inner supporting wall detachably connected to the puzzle plate and connected with the first and second main supporting walls.

Optionally, the first main supporting wall comprises a first hollow space, and the reinforcing assembly further comprises reinforcing ribs provided in the first hollow space.

Optionally, the reinforcing assembly further comprises a coupling hole, and the puzzle platform further comprises a rotating assembly having a fixing hole and a fixing screw, the fixing screw is passed through the fixing hole and the coupling hole for securing the rotating assembly onto the board assembly.

Still further objects and advantages will become apparent from a consideration of the ensuing description and drawings. These and other objectives, features, and advantages of the present invention will become apparent from the following detailed description, the accompanying drawings, and the appended claims.

DETAILED DESCRIPTION OF THE PREFERRED EMBODIMENTS

Figure 1:
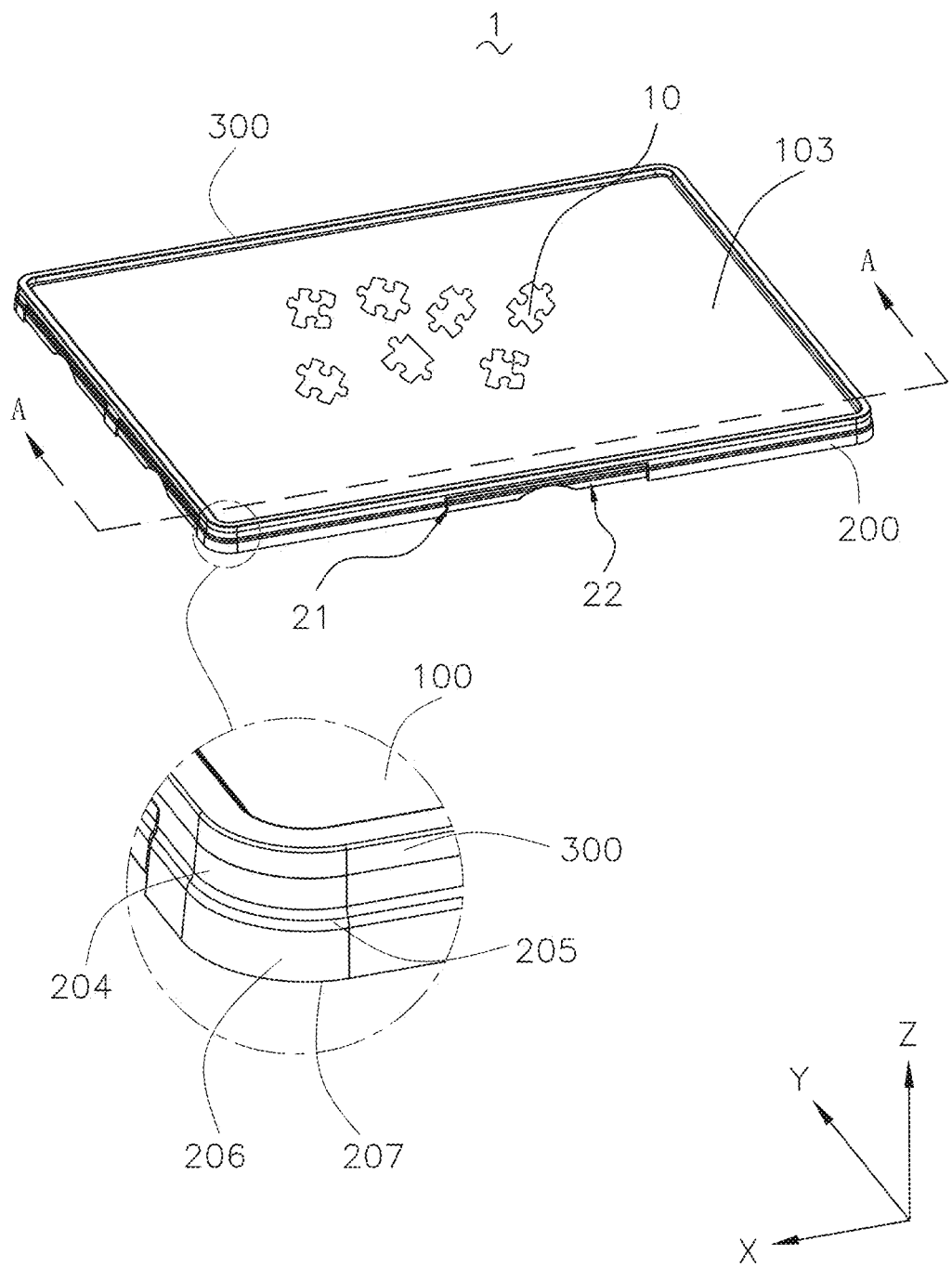
FIG. 1 is an illustrative isometric view of a puzzle platform according to a first embodiment of the present invention.
Figure 2:
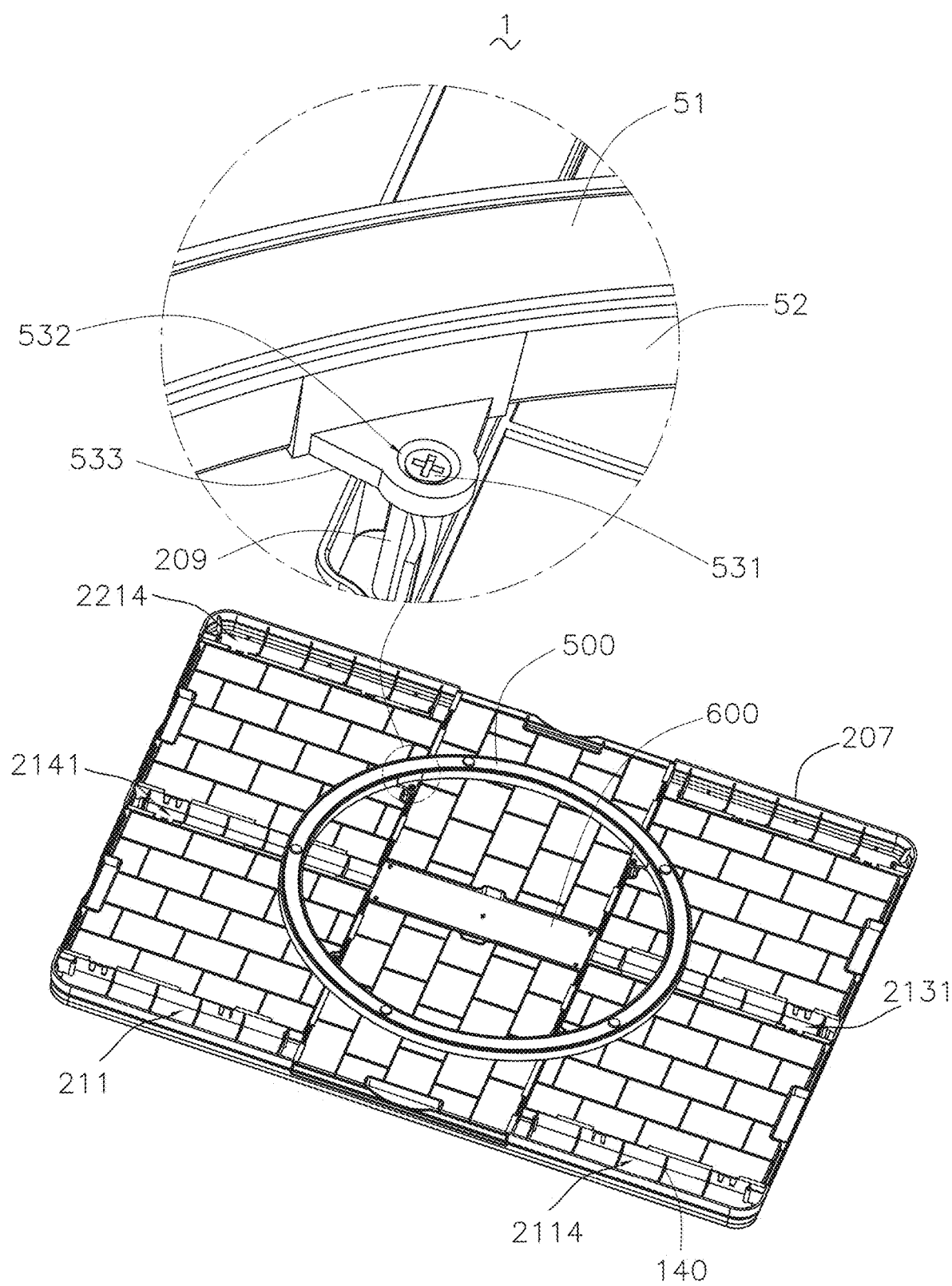
FIG. 2 is an illustrative isometric view of the puzzle platform shown in FIG. 1, but from another aspect.
Figure 3:
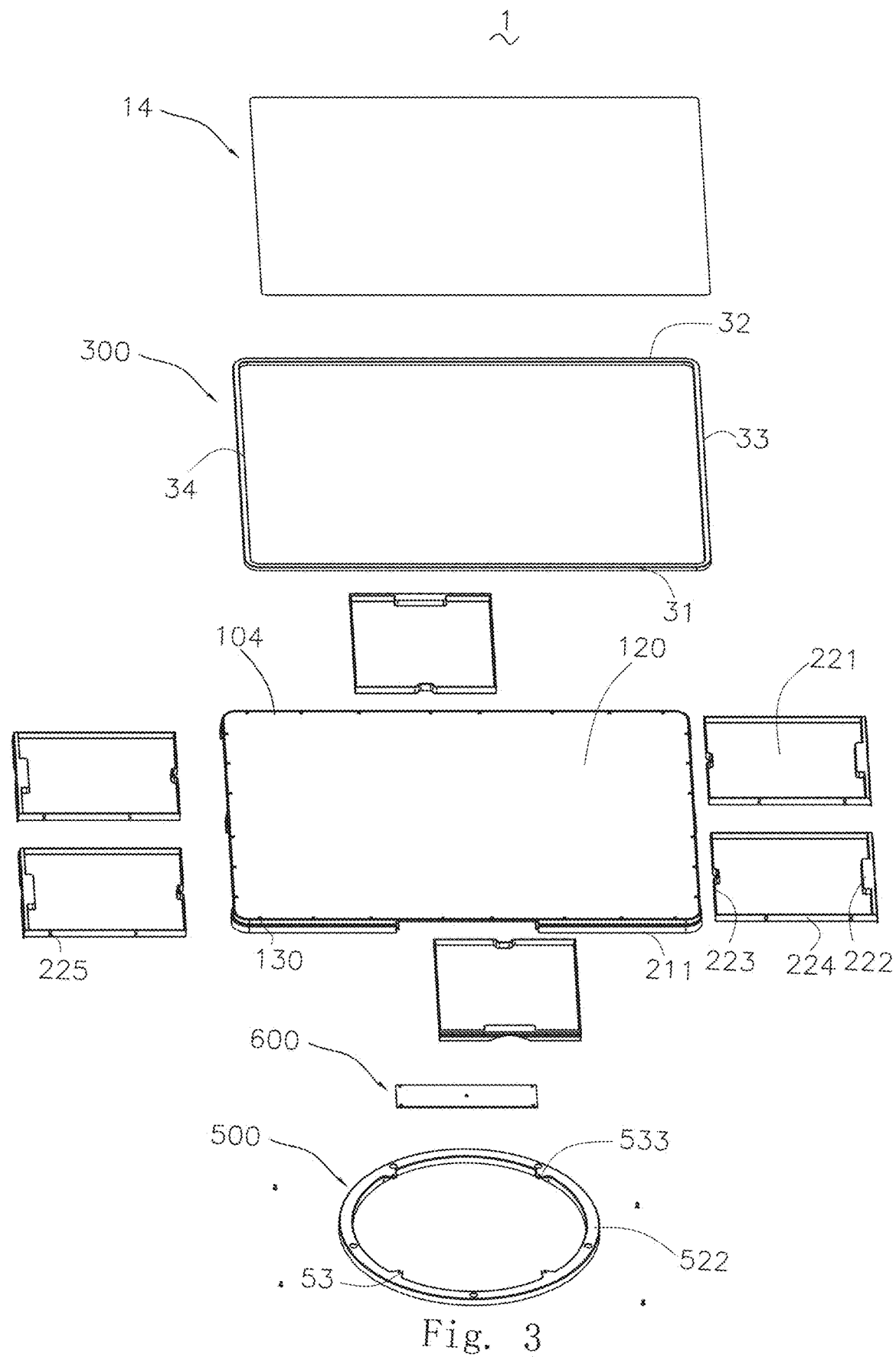
FIG. 3 is an exploded perspective view of the puzzle platform shown in FIG. 1.
Figure 4:
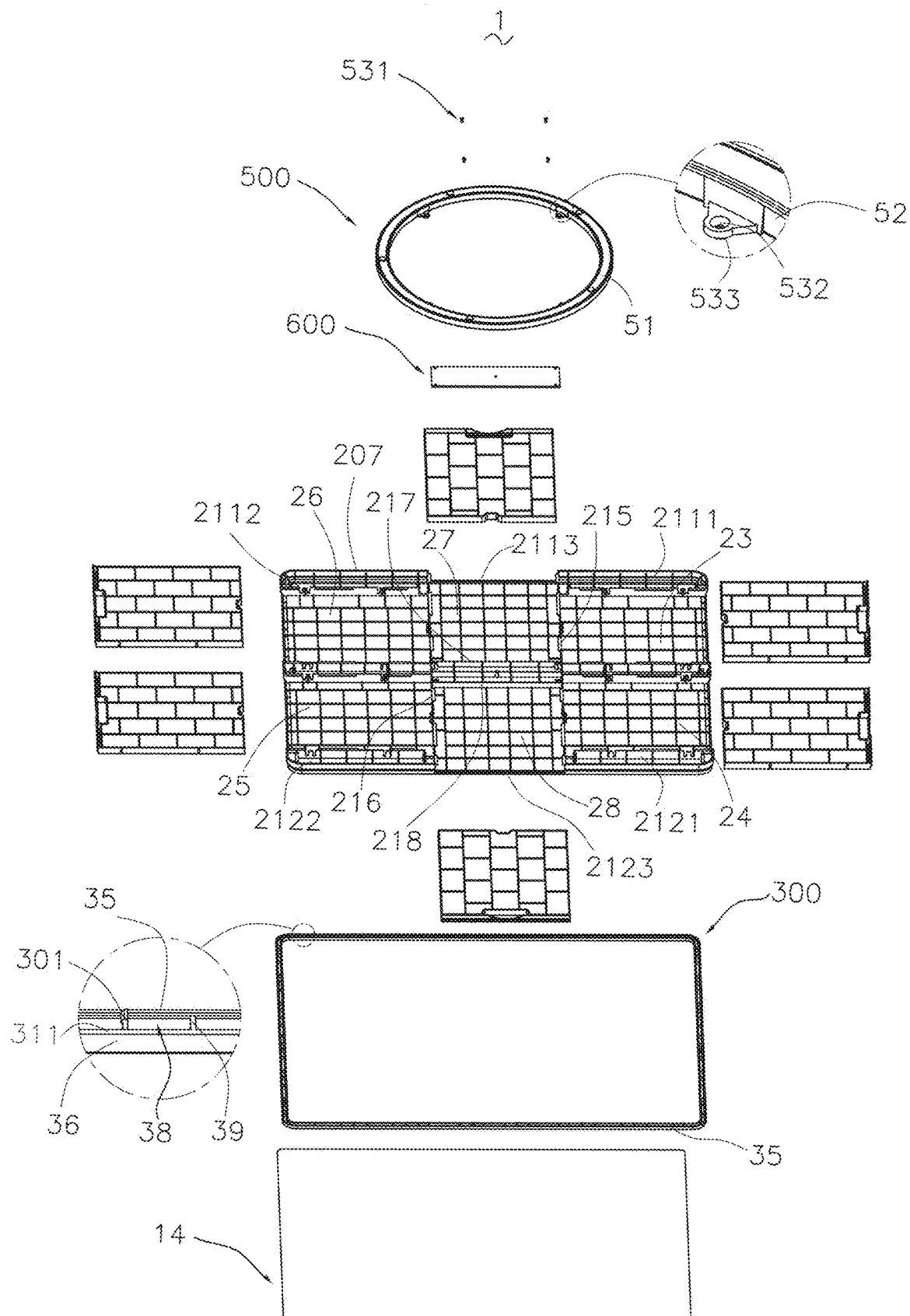
FIG. 4 is an exploded perspective view of the puzzle platform shown in FIG. 1, but from another aspect.
Figure 5:
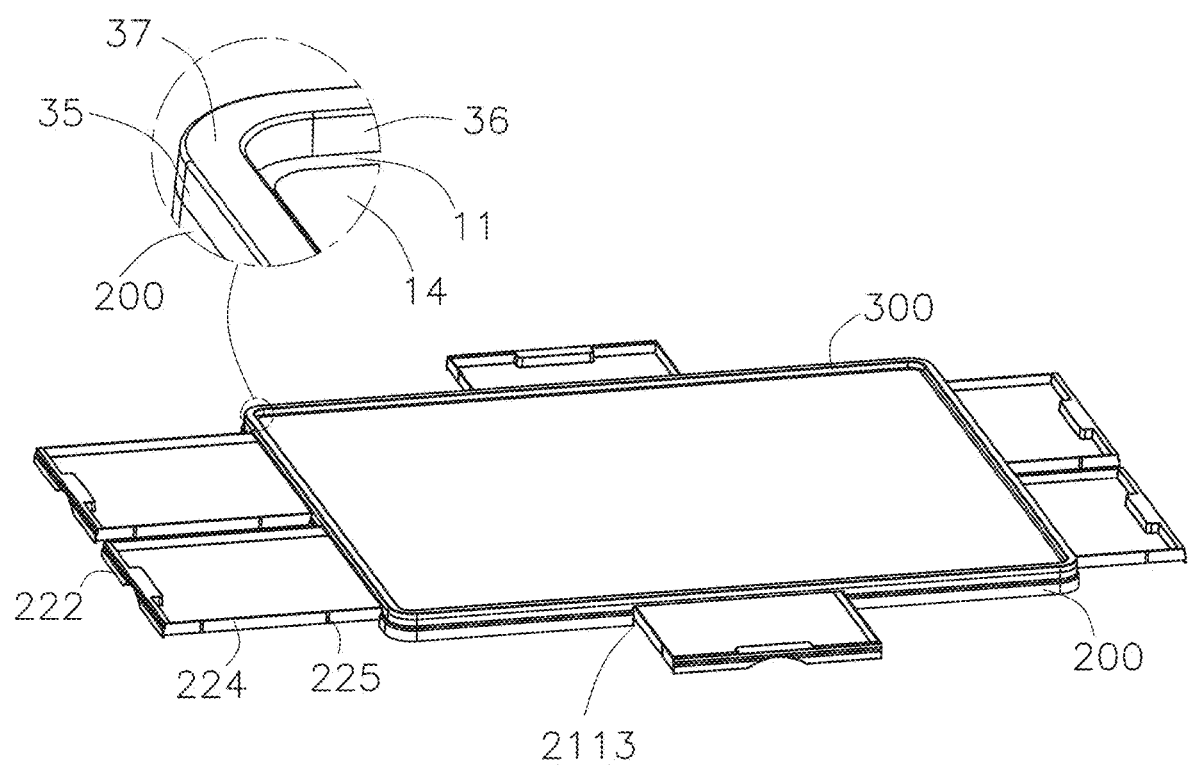
FIG. 5 is an illustrative isometric view of a board assembly of the puzzle platform shown in FIG. 1.
Figure 6:
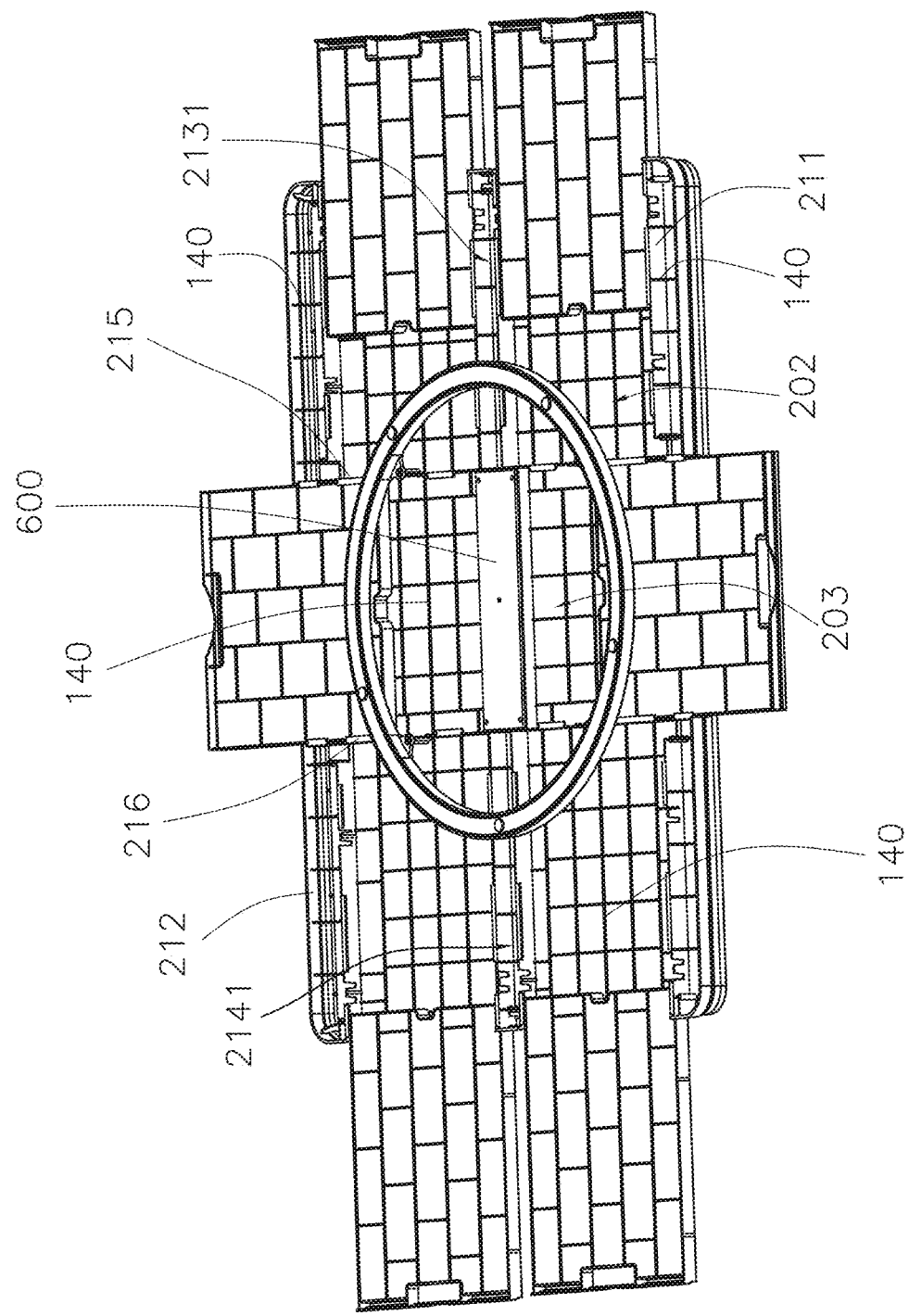
FIG. 6 is an illustrative isometric view of the puzzle platform shown in FIG. 1, with puzzle drawers partially pulled out from their corresponding drawer cavities.
Figure 7:
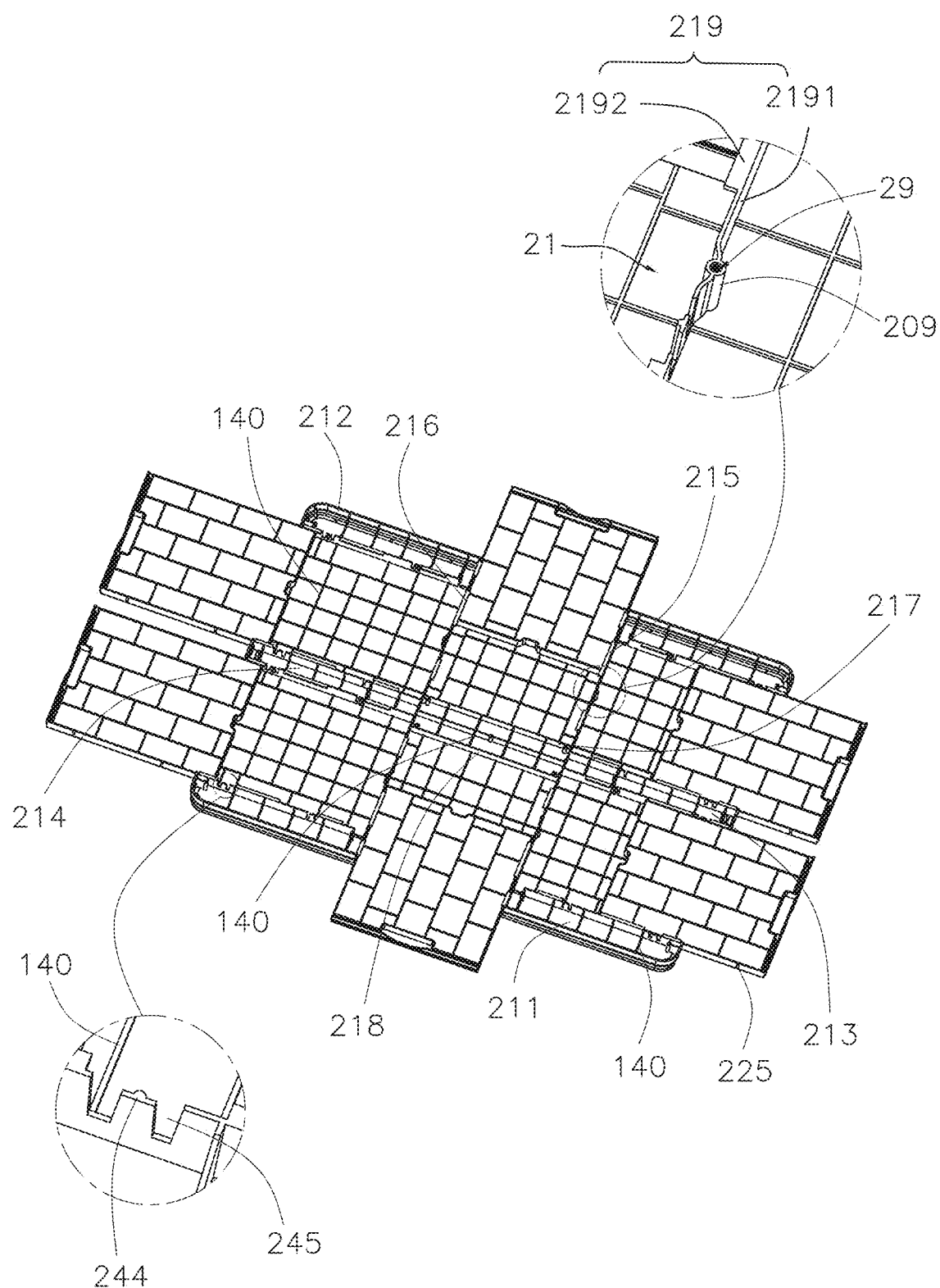
FIG. 7 is an illustrative isometric view of the puzzle platform shown in FIG. 1, with puzzle drawers partially pulled out from their corresponding drawer cavities, and a base and a rotating assembly removed.
Figure 8:
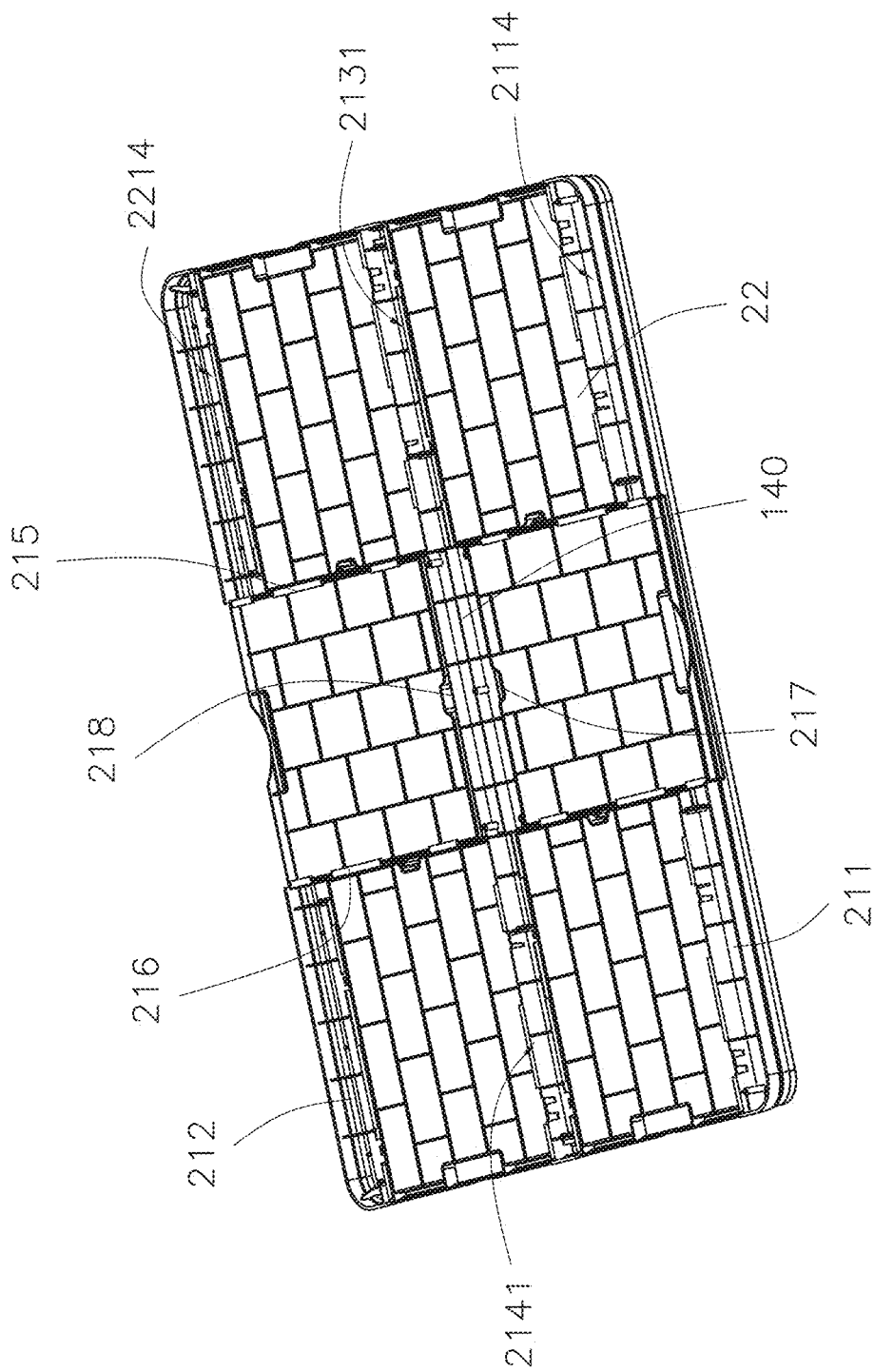
FIG. 8 is an illustrative isometric view of the puzzle platform shown in FIG. 1, with the base and rotating assembly removed.

The following description is disclosed to enable any person skilled in the art to make and use the present invention. Preferred embodiments are provided in the following description only as examples and modifications will be apparent to those skilled in the art. The general principles comprised in the following description would be applied to other embodiments, alternatives, modifications, equivalents, and applications without departing from the spirit and scope of the present invention.

Referring to FIGS. 1-12, a puzzle platform 1 is arranged for a user or a player to assemble a plurality of puzzle pieces 10 thereon and comprises a board assembly 2, and a rotating assembly 500 attached to the board assembly 2.

The board assembly 2 comprises a puzzle board 100 configured for placing the puzzle pieces 10, a reinforcing assembly 200 supporting the puzzle board 100 for forming a receiving space 3 cooperatively with the puzzle board 100, an upper part 300 mounted on the puzzle board 100, a base 600 attached to the reinforcing assembly 200, and at least two puzzle drawers 22 received in the receiving space 3. The rotating assembly 500 is configured to provide accessibility for the board assembly 2 to move the board assembly 2 in different directions with respect to a playing place. The board assembly 2 is embodied to have a rectangular shape having two longer longitudinal sides provided along a longitudinal direction X and two shorter transverse sides provided along a lateral direction Y perpendicular to the longitudinal direction X. Although good results have been shown with the board assembly 2 that is rectangular in shape, it is within the scope of the present invention that numerous other shapes of the board assembly 2 could be used to achieve the desired functionality as described herein.

The puzzle board 100 as shown is a rectangular board, which can be adapted to fit most puzzle patterns available on the market, however, within the scope of the present invention, many other shapes of puzzle boards can be used to fulfill the functions described herein, and the puzzle boards of uniform thickness can be of any shape, such as round, square, or rectangular, and so on. The puzzle board 100 comprises a plate portion 103 and a fixing portion 104 extending from the plate portion 103. The plate portion 103 comprises a puzzle plate 120 and an anti-slipping layer 14 attached to the puzzle plate 120. The puzzle board 100 includes an upper surface 11 for placing the puzzle pieces 10 thereon and a lower surface 12 opposite to the upper surface 11. It is worth mentioning that the puzzle board 100 has a predetermined size adapted for a larger scale puzzle, such as at least 1,000 puzzle pieces, being assembled on the puzzle board 100. Preferably, the anti-slipping layer 14 has a self-adhesive bottom surface adhered on the upper surface 11 of the puzzle plate 120, wherein the anti-slipping layer 14 can be removed from the puzzle plate 120 without damaging the puzzle plate 120 and the anti-slipping layer 14. Therefore, the anti-slipping layer 14 is reusable to place on the puzzle plate 120. Furthermore, the anti-slipping layer 14 serves as a backing layer of the puzzle pieces 10 after the puzzle pieces 10 are assembled. The flat puzzle plate 120 is made of non-slip felt surfaces to keep the puzzle pieces 10 and prevent the puzzle pieces 10 being slipped thereon. The area of the anti-slipping layer 14 matches with the area of the puzzle plate 120. It's optional that the area of the anti-slipping layer 14 matches with the area of the puzzle plate 120. The anti-slipping layer 14 is made of a plastic sheet, a silicone sheet, a transparent sheet, an opaque sheet, or a flexible sheet, and so on for retaining the puzzle pieces 10. It is optional that the anti-slipping layer 14 can be omitted.

As shown in FIGS. 1-12, the reinforcing assembly 200 is coupled with the puzzle board 100 for forming six drawer cavities 21. Six puzzle drawers 22 is received in the corresponding six drawer cavities 21. The puzzle plate 120 of the puzzle board 100, the fixing portion 104 and the reinforcing assembly 200 together form a monolithic structure. The upper part 300 is detachably connected to the fixing portion 104 of the puzzle board 100. The puzzle plate 120, the fixing portion 104 and the reinforcing assembly 200 are manufactured by injection molding to create an integral unit, thereby enhancing the mechanical strength of the board assembly 2 and reducing assembly costs. The puzzle board 100 of the puzzle platform 1 has a thin and large size. The length and/or the width of the puzzle board 100 is much greater than the thickness of the puzzle board 100, making the reinforcing assembly 200 essential for improving the structural strength of the puzzle board 100 and preventing distortion or deformation of the puzzle board 100.

As shown in FIGS. 1-12, in this embodiment, the reinforcing assembly 200 has six drawer cavities 21 and six puzzle drawers 22 received in the corresponding drawer cavity 21. The storage capacity of the puzzle drawers 22 varies according to the sizes of the puzzle pieces 10. The six drawer cavities 21 consist of four lateral cavities 202 and two longitudinal cavities 203. The four lateral cavities 202 comprise a first lateral cavity 23, a second lateral cavity 24, a third lateral cavity 25 and a fourth lateral cavity 26. The two longitudinal cavities 203 comprise a first longitudinal cavity 27 and a second longitudinal cavity 28. In this embodiment, the reinforcing assembly 200 not only improves the structural strength of the puzzle platform 1, but also forms the drawer cavities 21 align with the puzzle plate 120.

The reinforcing assembly 200 comprises a first main supporting wall 211 attached on the lower surface 12 of the puzzle board 100 along the longitudinal direction X, a second main supporting wall 212 attached on the lower surface 12 of the puzzle board 100 along the longitudinal direction X and disposed opposite to the first main supporting wall 211, a first dividing supporting wall 213 attached on the lower surface 12 of the puzzle board 100 along the longitudinal direction X and disposed between the first and second main supporting walls 211, 212, a second dividing supporting wall 214 attached on the lower surface 12 of the puzzle board 100 along the longitudinal direction X and disposed between the first and second main supporting walls 211, 212, a first inner supporting wall 215 attached on the lower surface 12 of the puzzle board 100 along the lateral direction Y and connected with the first and second main supporting walls 211, 212, and a second inner supporting wall 216 attached on the lower surface 12 of the puzzle board 100 along the lateral direction Y and connected with the first and second main supporting walls 211, 212. The first and second dividing supporting walls 213, 214 are spaced apart from each other. The first and second inner supporting walls 215, 216 are spaced apart from each other and disposed parallel to each other. The first and second dividing supporting walls 213, 214 and the first and second main supporting walls 211, 212 are disposed parallel to each other. The first dividing supporting wall 213 connects with the first inner supporting wall 215, and the second dividing supporting wall 214 connects with the second inner supporting wall 216 for forming interlaced structures, respectively. The reinforcing assembly 200 further comprises a plurality of drawer holders 219 to retain the puzzle drawers 22 in the drawer cavities 21, respectively. Each drawer holder 219 comprises a reinforcing wall 2191 integrally extending from the puzzle board 100 and a bending portion 2192 extending integrally and bendably from the reinforcing wall 2191 towards a corresponding drawer cavity 21 of the receiving space 3. The first main supporting wall 211, the second main supporting wall 212, the first dividing supporting wall 213, the second dividing supporting wall 214, the first inner supporting wall 215, and the second inner supporting wall 216 may all serve as the reinforcing walls 2191.

The first lateral cavity 23 is formed by the first main supporting wall 211 cooperated with the first dividing supporting wall 213 and the first inner supporting wall 215. Similarly, the second lateral cavity 24 is formed by the second main supporting wall 212 cooperated with the first dividing supporting wall 213 and the first inner supporting wall 215. The third lateral cavity 25 is formed by the second main supporting wall 212 cooperated with the second dividing supporting wall 214 and the second inner supporting wall 216. Lastly, the fourth lateral cavity 26 is formed by the first main supporting wall 211 cooperated with the second dividing supporting wall 214 and the second inner supporting wall 216. In this embodiment, the first dividing supporting wall 213 cooperates with the first and second main supporting wall 211,212 for varying volumes of the first and second lateral cavities 23, 24. Moreover, the second dividing supporting wall 214 cooperates with the first and second main supporting wall 211, 212 for varying volumes of the third and fourth lateral cavities 25, 26.

Additionally, the reinforcing assembly 200 comprises a third dividing supporting wall 217 extending from the lower surface 12 of the puzzle plate 102 along the longitudinal direction X and connected with the first and second inner supporting walls 215, 216 and a fourth dividing supporting wall 218 extending from the lower surface 12 of the puzzle plate 102 along the longitudinal direction X and connected with the first and second inner supporting walls 215, 216. The third and fourth dividing supporting walls 217, 218 are located between the first and second inner supporting walls 215, 216 and spaced apart to each other. The third and fourth dividing supporting walls 217, 218 are parallel to the first and second main supporting walls 211, 212. The first and second main supporting walls and the first through fourth dividing supporting walls are configured for improving the structural strength of the puzzle platform along the longitudinal direction X, respectively. The first and second inner supporting walls are configured for improving the structural strength of the puzzle platform along the lateral direction Y, respectively. The first and second inner supporting walls and the first through fourth dividing supporting walls are arranged between the first and second main supporting walls, respectively. The first and second main supporting walls 211, 212 and first and second inner supporting walls 215, 216 are integral with each other. The first and second inner supporting walls 215, 216 and the first and second dividing supporting wall 213, 214 are integral with each other. Optionally, each of the main supporting walls, each of the inner supporting walls and/or each of the dividing supporting walls may be extended in any direction, spaced apart with each other as long as it is configured for improving the structural strength of the board assembly and/or forming the drawer cavity together with the puzzle plate.

Moreover, the base 600 made of metal material is fixed to the third and fourth dividing supporting walls 217, 218 to provide sufficient tensile force for the puzzle plate 120, increase the strength of the puzzle plate 120, and prevent deformation of the puzzle plate 120. It is worth noting that the material of the base 600 is not limited to metal.

The first main supporting wall 211 comprises a right first part 2111 connected with the first inner supporting wall 215, and a left first part 2112 connected with the second inner supporting wall 216 and spaced apart from the right first part 2111 for forming a first opening 2113. The first longitudinal cavity 27 is formed by the first and second inner supporting walls 215, 216 together with the third dividing supporting wall 217. The first longitudinal cavity 27 is communicated with the first opening 2113, so that the corresponding puzzle drawer 22 can be slide in-and-out via the first opening 2113. The second main supporting wall 212 comprises a right second part 2121 connected with the first inner supporting wall 215, and a left second part 2122 connected with the second inner supporting wall 216 and spaced apart from the right second part 2121 for forming a second opening 2123.

The second longitudinal cavity 28 is formed by the first and second inner supporting walls 215, 216 together with the fourth dividing supporting wall 218. The second longitudinal cavity 28 is communicated with the second opening 2123, so that the corresponding puzzle drawer 22 can be slide in-and-out via the second opening 2123.

The periphery of the reinforcing assembly 200 comprises a connecting wall 204 connected to the puzzle board 100, a step portion 205 extending downwardly from the connecting wall 204 along a direction away from the center of the puzzle plate 120, and a supporting wall 206 extending downwardly from the step portion 205. The outline of the periphery of the reinforcing assembly 200 is rectangular with rounded corners. The outline of the upper part 300 is substantially the same as that of the fixing portion 104. The outline of the fixing portion 104 is substantially the same as that of the connecting wall 204. Therefore, the outline of the upper part 300 is substantially the same as that of the connecting wall 204 of the reinforcing assembly 200.

According to the first embodiment, the four lateral cavities 202 are formed at the transverse sides of the puzzle board 100 respectively. Particularly, the first and second lateral cavities 23, 24 are spacedly formed at each of the transverse sides of the puzzle board 10. The third and fourth lateral cavities 25, 26 are spacedly formed at each of the other transverse sides of the puzzle board 10. In other words, two corresponding puzzle drawers 22 are slidably coupled at each of the transverse sides of the puzzle board 10. Therefore, four puzzle drawers 22 are slidably coupled at the transverse sides of the puzzle board 10. It is worth mentioning that each puzzle drawer 22 is independently actuated to slide in-and-out of the lateral cavities 202. Since the puzzle drawers 22 are slidably coupled at the transverse sides of the puzzle board 100, each puzzle drawer 22 is relatively long enough and each drawer cavity 21 is deep enough to retain the puzzle drawer 22 therein so as to prevent the puzzle drawer 22 being slid out of the drawer cavity 21 accidentally or unintentionally when moving the puzzle board 100 through the rotating assembly 500. Accordingly, a length of each puzzle drawer is slightly smaller than half of the length of the puzzle board between the transverse sides thereof.

Each of the puzzle drawer 22 comprises a rectangular bottom panel 221 slidably received in the corresponding drawer cavity 21, a front panel 222 extending from the bottom panel 221, a back panel 223 extending from the bottom panel 221 and opposite to the front panel 222, a pair of side panels 224 extending from the bottom panel 221 for connected with the front panel 222 and the back panel 223. The front panel 222, the back panel 223, and the pair of side panels 224 form a one-pieces structure. Further, the bottom panel 221 is integral with front panel 222, the back panel 223, and the pair of side panels 224 to form a one-pieces structure.

Figure 12:
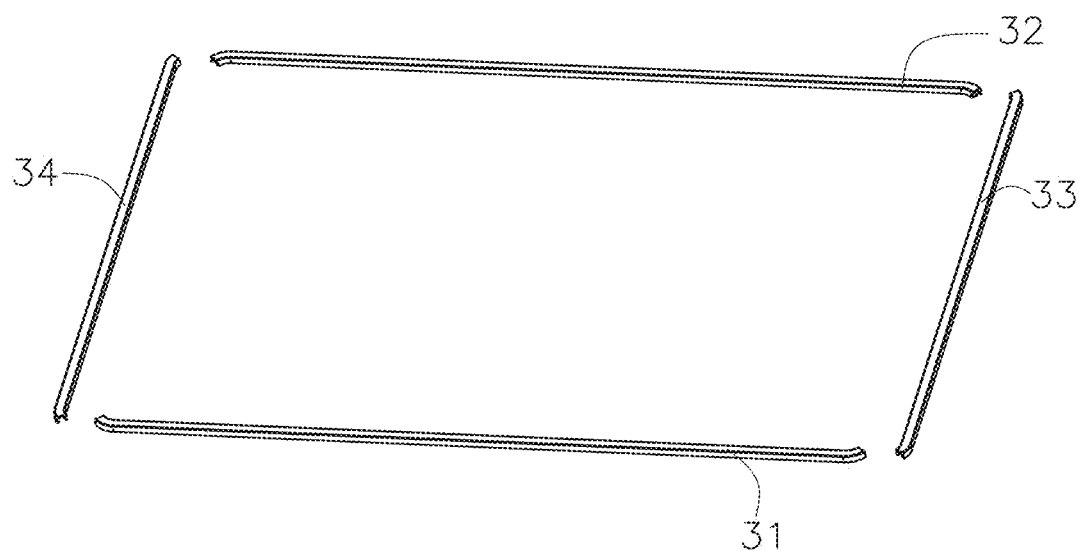
FIG. 12 illustrates an alternative configuration of an upper part of the puzzle platform shown in FIG. 1.
Figure 13:
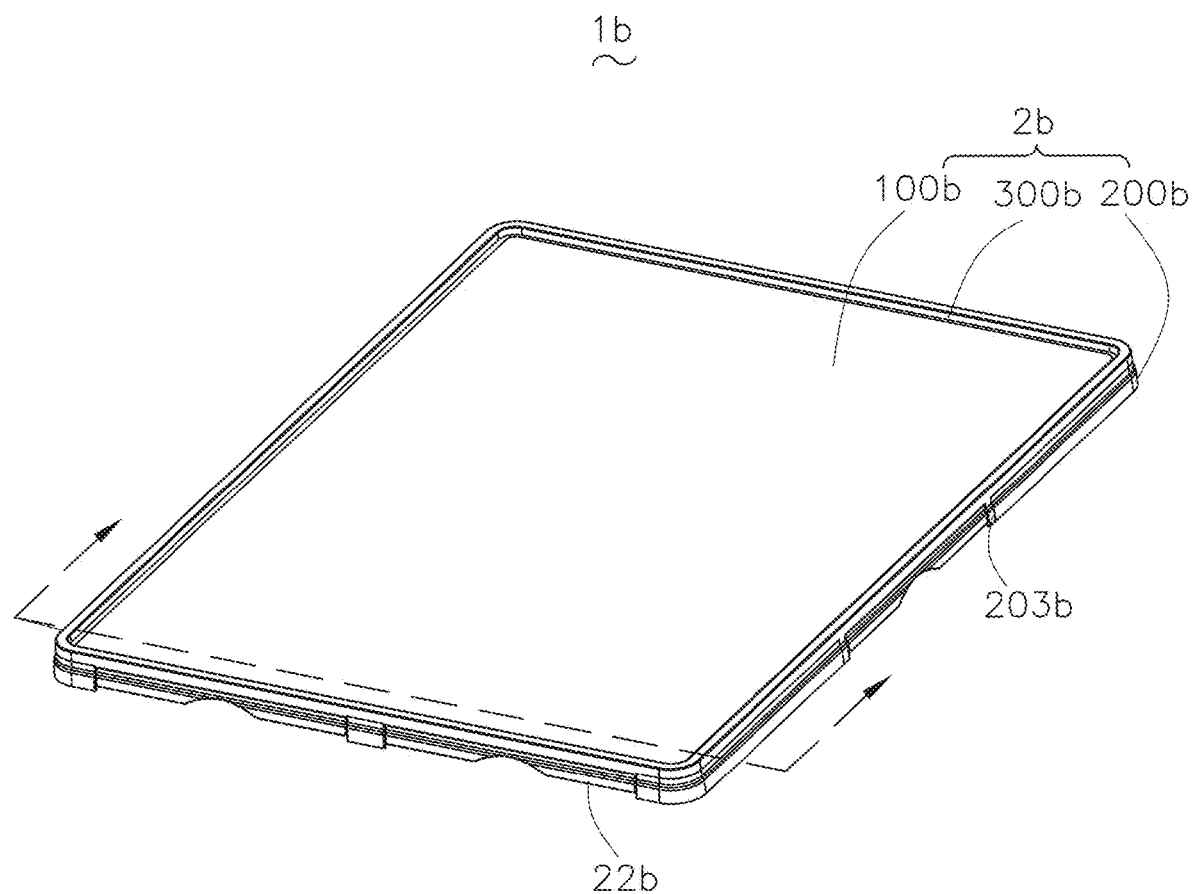
FIG. 13 is an illustrative isometric view of a puzzle platform according to a second embodiment of the present invention.
Figure 14:
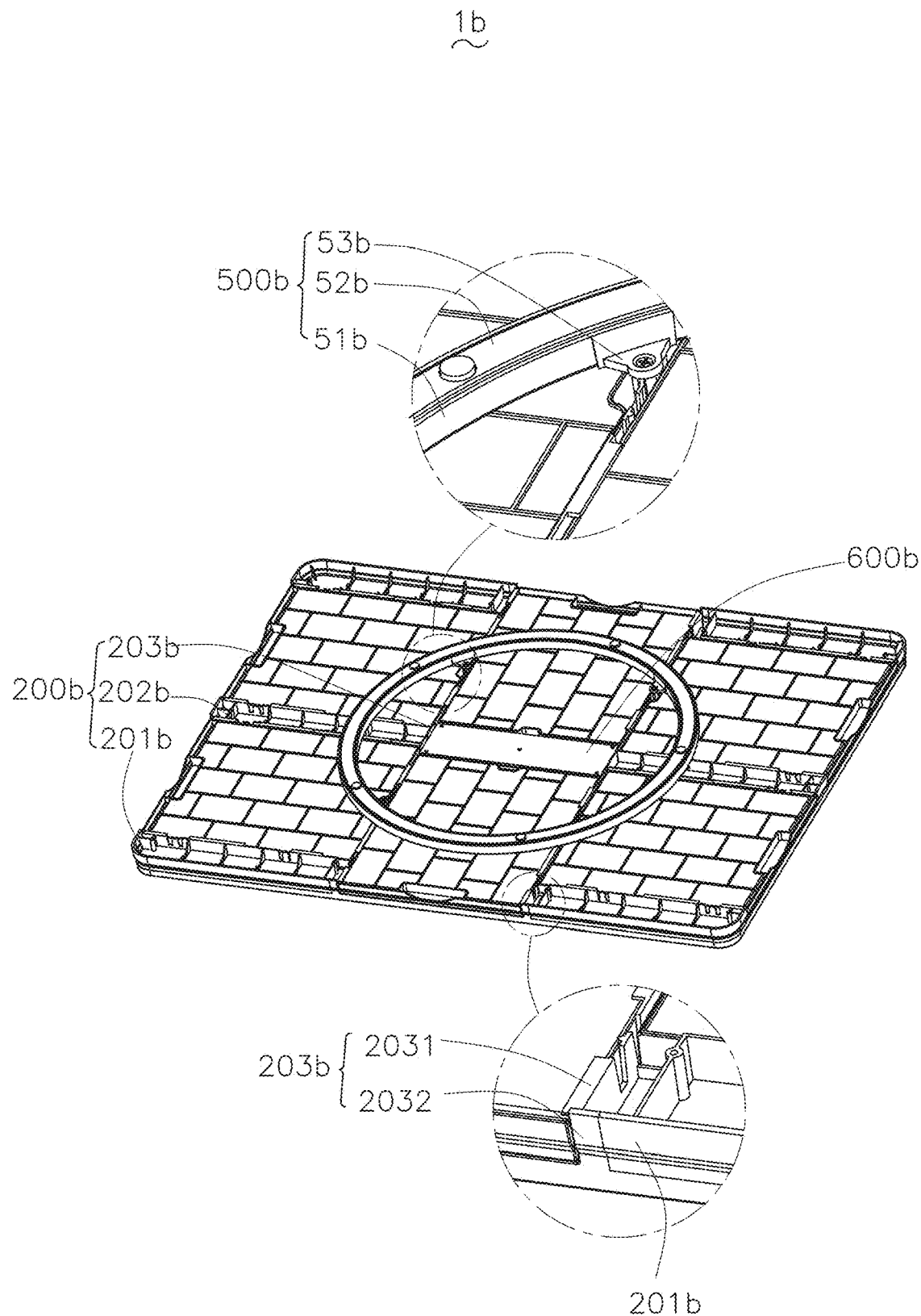
FIG. 14 is an illustrative isometric view of the puzzle platform shown in FIG. 13, but from another aspect.

The reinforcing assembly 200 and the upper part 300 are provided on two sides of the puzzle board 100. The upper part 300 is substantially perpendicular to the puzzle board 100 and may take various shapes, such as circular, square, rectangular and so on. The upper part 300 is generally four pieces and substantially strip-shaped. The upper part 300 comprises a first extending wall 31 mounted on the fixing portion 104 and arranged along the longitudinal direction X, a second extending wall 32 mounted on the fixing portion 104 and spaced apart from the first extending wall 31, a third extending wall 33 mounted on the fixing portion 104 and arranged along the lateral direction Y for connected with the adjacent first and second extending walls 31, 32, and a fourth extending wall 34 mounted on the fixing portion 104 and spaced apart from the third extending wall 33 for connected with the adjacent first and second extending walls 31, 32. The first and second extending walls 31, 32 are parallel to each other in the longitudinal direction X. The third and fourth extending walls 33, 34 are parallel to each other in the lateral direction Y. This structure of the upper part 300 prevents the players from accidentally pushing the puzzle pieces 10 off the puzzle plate 120. Each extending wall is substantially strip-shaped and interconnected with the adjacent extending walls for forming a closed structure. The upper part 300 has a curved shape to prevent the puzzle pieces from falling off when the board assembly is rotated on the playing place via a rotation movement of the rotating assembly and/or when the board assembly is moved by a user or a player from one place to another. The upper part 300 is an integral unit. The first through fourth extending walls 31, 32, 33, 34 are integrated with each other to form a one-piece structure. The puzzle board 100 and first through fourth extending walls 31, 32, 33, 34 form a workspace 13 for containing the puzzle pieces 10. The outline of the upper part 300 is rectangular with rounded corners 303. Alternatively, as shown in FIG. 12, each of extending walls 31, 32, 33, 34 may be detachably assembled edge-to-edge to form the upper part 300.

The upper part 300 is detachably connected to the fixing portion 104 of the puzzle board 100. The puzzle platform 1 further comprises a complementary conformation 400 for securely fixing the upper part 300 on the puzzle board 100. The complementary conformation 400 comprises a plurality of fastening holes 130 drilled completely through the fixing portion 104 and a plurality of fastening hooks 301 provided on the upper part 300. Each of the fastening hooks 301 passes through a corresponding fastening hole 130 and fastened on the fixing portion 104 for fixing the upper part 300 on the puzzle board 100 firmly. In an alternative embodiment, the plurality of fastening holes may be provided on the upper part 300 and the fastening hooks may be provided on the puzzle board 100.

The upper part 300 comprises a circular outer wall 35 extending upwardly from the fixing portion 104, a circular inner wall 36 opposite to the outer wall 35 and extending upwardly from the fixing portion 104, an upper wall 37 connected with the outer and inner walls 35, 36 and spaced apart from the fixing portion 104, an upper space 38 surrounded by the upper wall 37 together with the outer and inner walls 35, 36 for reducing the weight of the board assembly 2. The circular outer wall 35a and circular inner wall 36 together form a lower portion 311 that is opposite to and distant from the upper wall 37. The fastening hooks 301 are spaced and extended from the upper wall 37. The fastening hooks 301 are protruded from the upper space 38. The upper part 300 further comprises a plurality of reinforcing parts 39 for preventing the distortion or deformation of the upper part 300. The fastening hooks 301 are located below the upper wall 37 and protrude from the lower portion 311 of the upper part 300. Each of the reinforcing parts 39 is simultaneously connected with the outer and inner walls 35, 36, and the upper wall 37. In an alternative embodiment, each of the reinforcing part may be connected to one or two of the outer and inner walls 35, 36, and the upper wall 37. A first joining portion 351 of the upper wall 37 and outer wall 35 is curved. A second joining portion 352 of the upper wall 37 and inner wall 36 is also curved.

One end of the first dividing supporting wall 213 is connected to the first inner supporting wall 215 and substantially perpendicular to the first inner supporting wall 215. The other end of the first dividing supporting wall 213 partly overlaps with the third extending wall 33 in a thickness direction of the board assembly 2. Similarly, one end of the second dividing supporting wall 214 is connected with the second inner supporting wall 216 and substantially perpendicular to the second inner supporting wall 216. The other end of the second dividing supporting wall 214 partly overlaps with the fourth extending wall 34 in a thickness direction Z of the board assembly 2.

Figure 9:
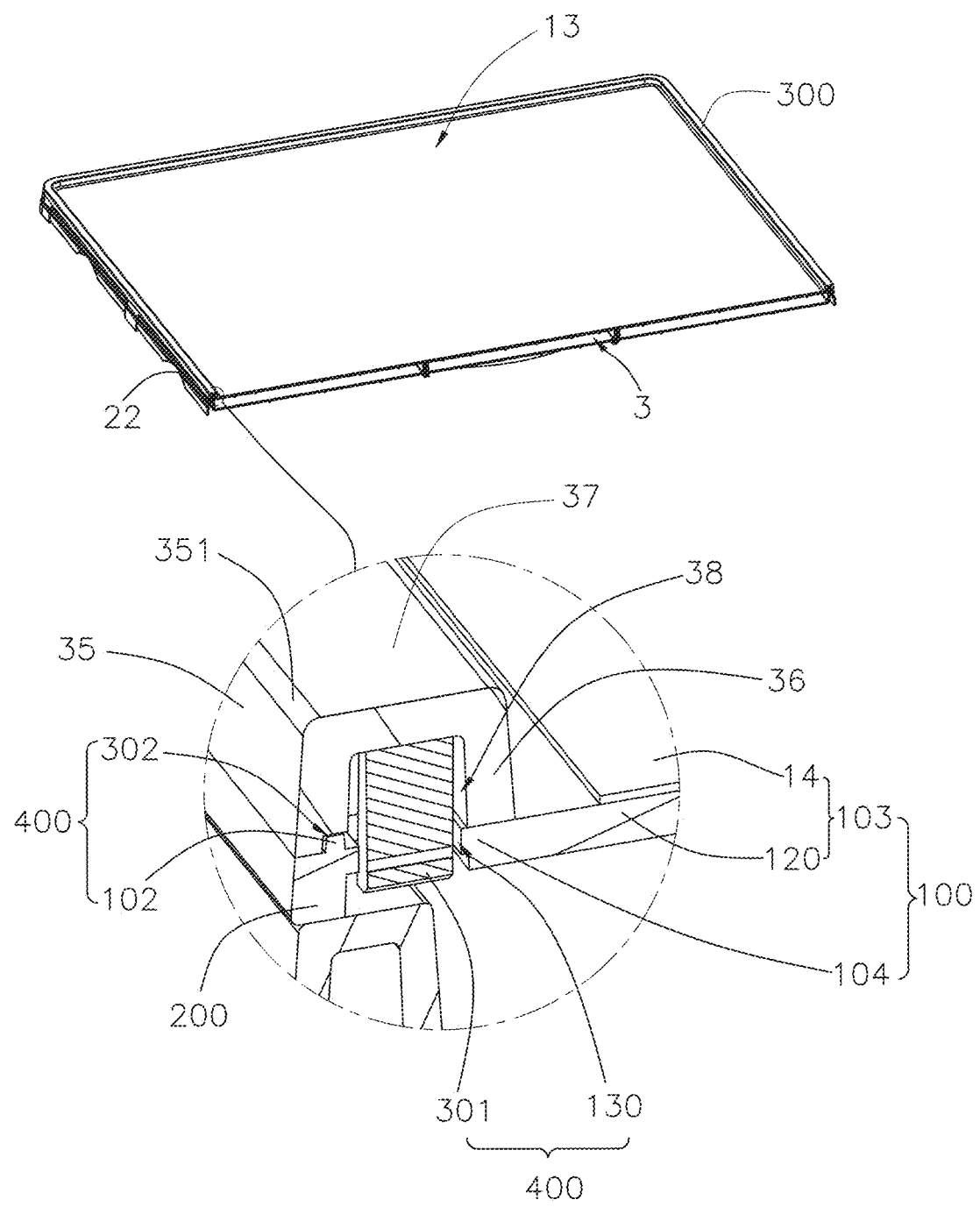
FIG. 9 is a cross-sectional view of the puzzle platform taken along line A-A of FIG. 1.
Figure 10:
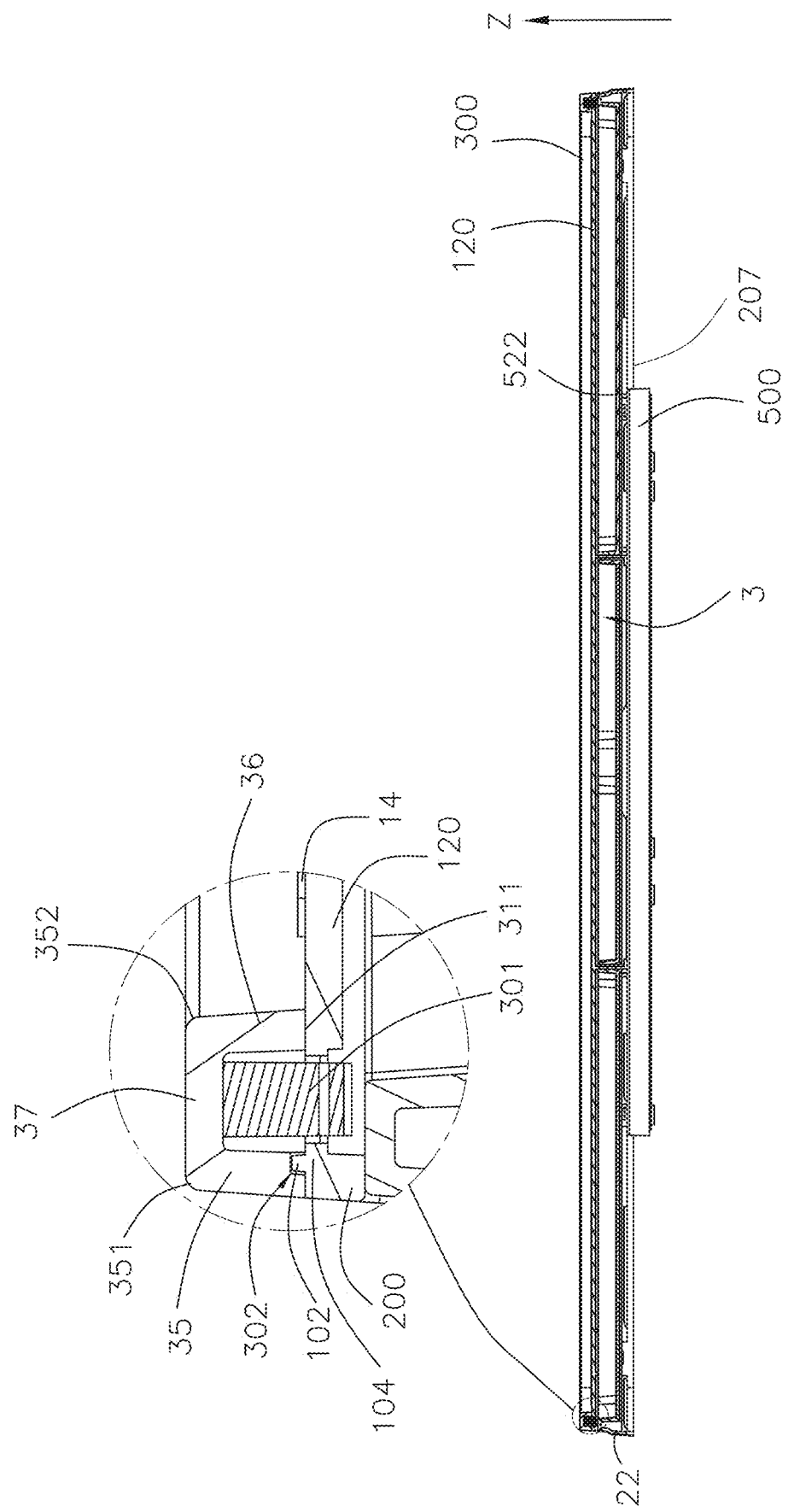
FIG. 10 is a cross-sectional view of the puzzle platform taken along line A-A of FIG. 1, but from another aspect.

Referring to FIGS. 9 and 10, the complementary conformation further comprises a protruding portion 102 and a fixing groove 302 engaged with the protruding portion 102. The protruding portion 102 is protruded from the upper surface 11 of the board 100. The fixing groove 302 is provided on the outer wall 35 and engaged with the protruding portion 102 for fixing the upper part 300 on the puzzle board 100 firmly. Additionally, the fixing groove may also be provided on the inner wall 36.

Figure 11:
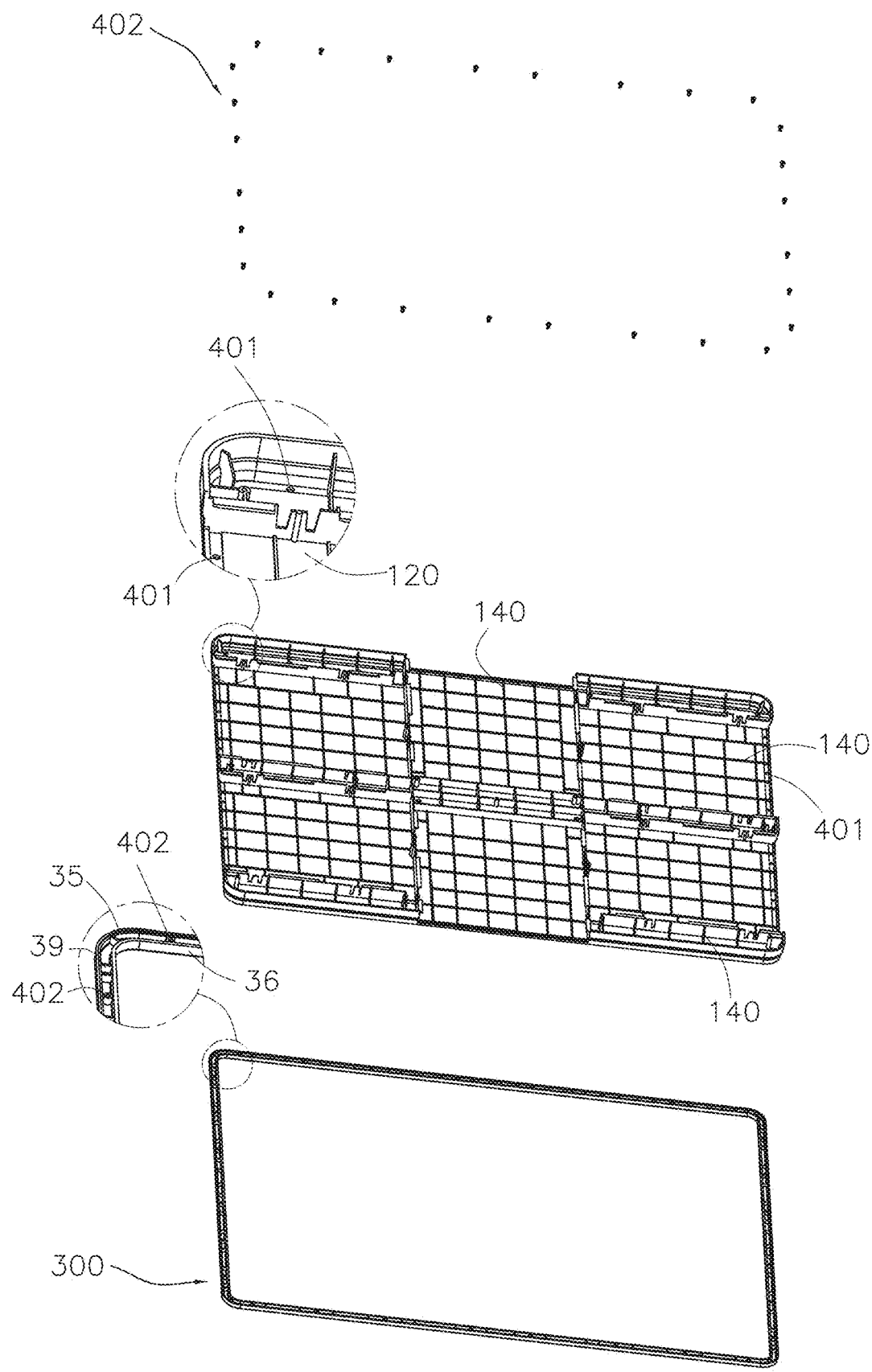
FIG. 11 illustrates an alternative configuration of a complementary conformation of the puzzle platform shown in FIG. 1.

In an alternative embodiment, the upper part 300 and the fixing portion 104 can be assembled together using threads, snap-fit, friction fit, screws, rivets or other similar complementary conformations. Referring to FIG. 11, the complementary conformation comprises a plurality of first thread holes 401 provided on the fixing portion 104, a plurality of second thread holes 402 provided on the upper part 300 and a plurality of fastening screw 403 passed through a corresponding first and second thread holes 401, 402 and fastened on the upper part 300 for fixing the upper part 300 on the puzzle board 100 firmly.

The reinforcing assembly 200 of the board assembly 2 further comprises a plurality of reinforcing ribs 140 with different patterns integrally extended from the puzzle plate 120 to solve the problem of the distortion or deformation of the puzzle plate 120. The reinforcing ribs 140 can be provided in each drawer cavities 21. In other optional embodiments, the reinforcing ribs can also be provided in some drawer cavities rather than all of the six drawer cavities 21.

In order to reduce the weight of the board assembly 2, the first and second main supporting walls 211, 212 are hollow in structure. The first main supporting wall 211 comprises a first hollow space 2114. The second main supporting wall 212 comprises a second hollow space 2214. The reinforcing ribs 140 can be provided in the first hollow space 2114 and/or the second hollow space 2214. The first and second dividing supporting walls 213, 214 are also of hollow structure. The first dividing supporting wall 213 comprises a third hollow space 2131. The second dividing supporting wall 214 comprises a fourth hollow space 2141. The reinforcing ribs 140 can be provided in the third hollow space 2131 and/or the fourth hollow space 2141.

The rotating assembly 500 comprises a first moving member 51 coupled to the board assembly 2 and a second moving member 52 rotatably coupled to the first moving member 51, along with a plurality of fixing elements 53 for securely mounting the rotating assembly 500 to the board assembly 2. It is worth mentioning that the rotating assembly 500 is preferred to be coupled coaxially with the center of gravity of the board assembly 2, for example at the center portion of the board assembly 2, such that the board assembly 2 can be moved on the playing place in a balanced manner.

According to this embodiment of the present invention, the board assembly 2 is adapted for being self-rotated 360° on the playing place via a rotation movement between the first and second moving members 51, 52. In other words, the user is able to selectively rotate the board assembly 2 from one longitudinal side to the opposite longitudinal side or to any of the shorter transverse sides without walking around the board assembly 2. For example, the user is able to assemble one puzzle piece 10 on one side of the board assembly 2 and then rotate the board assembly 2 by 180° in order to assembly another puzzle piece 10 on the opposite side of the board assembly 2, so as to speed up the assembling time of the puzzle pieces 10. It should be understood that the rotating angle of the puzzle board 100 can be adjusted to be smaller than 360°.

Each of the fixing elements 53 has a fixing screw 531 and a fixing hole 532 engaged with a corresponding fixing screw 531 to secure the rotating assembly 500 onto the board assembly 2. The reinforcing assembly 200 further comprises at least one coupling portions 209, each of which integrally extends from the puzzle board 100 and has at least one coupling hole board 100 cooperated with the fixing hole 532 for being engaged with the fixing screws 531. In this embodiment, the coupling portions 209 are provided on the first and second inner supporting walls 215, 216, respectively. In alternative embodiment, the coupling portion 209 may be provided on the dividing walls or the main supporting walls. Referring to FIGS. 1-4, 7, and 10, the reinforcing assembly 200 further comprises a bottom portion 207 distant from the puzzle plate 120 along the thickness direction Z of the puzzle plate 120. At least part of the rotating assembly 500 is closer to the puzzle plate 120 than the bottom portion 207. The rotating assembly 500 comprises a lower portion 522 facing the reinforcing assembly 200. The lower portion 522 is also closer to the puzzle plate 120 than the bottom portion 207. Each fixing element 53 comprises a fixing surface 533 mounted on the corresponding coupling portions 209. The fixing surface 533 is connected to the lower portion 522. Therefore, the fixing surface 533 is closer to the puzzle plate 120 than the bottom portion 207.

Furthermore, the reinforcing assembly 200 comprises a plurality of limiting bars 244, and the puzzle drawers 22 comprises a plurality of limiting grooves 225 matching with the limiting bars 244, so that the puzzle drawers 22 are easily and smoothly fixed into the corresponding puzzle drawer cavities 21. Preferably, the reinforcing assembly 200 further comprises a plurality of limiting openings 245 adjacent to the corresponding limiting bar 244 for providing the limiting bars 244 with good elasticity.

The upper part 300, the puzzle plate 120, the fixing portion 104 and/or the reinforcing assembly 200 may be made of plastic, wood, or metal materials. When the reinforcing assembly 200 is made of plastic using molding techniques, the puzzle plate 120 and the fixing portion 104 are integral with the reinforcing assembly 200, making each of the supporting walls a monolithic structure. This design allows the upper part 300 to be detachably inserted into the fixing portion 104, simplifying assembly process, increasing the service life of the device, enhancing the support force applied on the puzzle board, and significantly reducing material cost and assembly costs.

FIGS. 13-24 show a puzzle platform 1b of a second embodiment of the present invention. A puzzle platform 1b comprises a board assembly 2b, and a rotating assembly 500b attached to the board assembly 2b. The board assembly 2b comprises a puzzle board 100b, a reinforcing assembly 200b supporting the puzzle board 100b for forming a receiving space 3b cooperatively with the puzzle board 100b, an upper part 300b integrally extended upwardly from the puzzle board 100b, a base 600b attached to the reinforcing assembly 200b, and six puzzle drawers 22b received in the receiving space 3b. The second embodiment is similar to the first embodiment of the present invention, except that the puzzle board 100b and an upper part 300b form a one-piece structure. At least a portion of the reinforcing assembly 200b is detachably connected to the puzzle board 100b.

The puzzle board 100b comprises a puzzle plate 120b and an anti-slipping layer 14b attached to the puzzle plate 120b. It is optional that the anti-slipping layer 14 can be omitted. The puzzle board 100b is embodied to have a rectangular shape having two longer longitudinal sides provided along a longitudinal direction X' and two shorter transverse sides provided along a lateral direction Y' perpendicular to the longitudinal direction X'. The puzzle plate 120 is integral with the upper part 300 for forming a workspace 13b for containing a plurality puzzle pieces 10.

The reinforcing assembly 200b comprises a pair of main supporting walls 201b detachably connected to the puzzle plate 120b, and a pair of dividing supporting walls 202b detachably connected to the puzzle plate 120b. Each of the dividing supporting wall 202b and the corresponding main supporting wall 201b are arranged on two sides of the puzzle drawers 22b for guiding puzzle drawers 22b the being pulled and slid out of the receiving space 3b.

At least a portion of the reinforcing assembly 200b is detachably connected with the puzzle board 100b. It simplifies the transportation of the puzzle platform and reducing transport costs. This configuration also facilitates maintenance of the puzzle platform. For example, if the main supporting wall 201b is damaged, instead of requiring replacement of the entire puzzle platform, the present invention allows for detaching the damaged main supporting wall 201b and replacing it with an intact one.

The reinforcing assembly 200b further comprises a pair of inner supporting walls 203b, integrally extended from the puzzle plate 120, to prevent distortion or deformation of the puzzle plate 120 and to fix the main supporting wall 201b and the dividing supporting walls 202b, thereby improving assembly stability. The pair of inner supporting walls 203b are spaced apart from each other and connected with the main supporting walls 201b. Each of the inner supporting walls 203b comprises a longitudinal inner part 2031 extending along the longitudinal direction X' and a lateral inner part 2032 extending along the lateral direction Y'. The dividing supporting walls 202b are detachably connected to the longitudinal inner part 2031 and the main supporting wall 201b is detachably connected to the lateral inner part 2032, thus enhancing improving the stability of the puzzle platform 1b.

Referring to FIGS. 14-19, the puzzle platform 1b further comprises a complementary conformation 400b comprising a plurality of fastening holes 430b drilled completely through the reinforcing assembly 200b, and a plurality of fastening hooks 401b provided on the puzzle plate 120b. Each of the fastening hooks 301 is passed through a corresponding fastening hole 430b for fixing the reinforcing assembly 200b on the puzzle plate 120b firmly. In an alternative embodiment, the plurality of fastening holes may be provided on the puzzle plate, and the fastening hooks may be provided on the reinforcing assembly.

Figure 22:
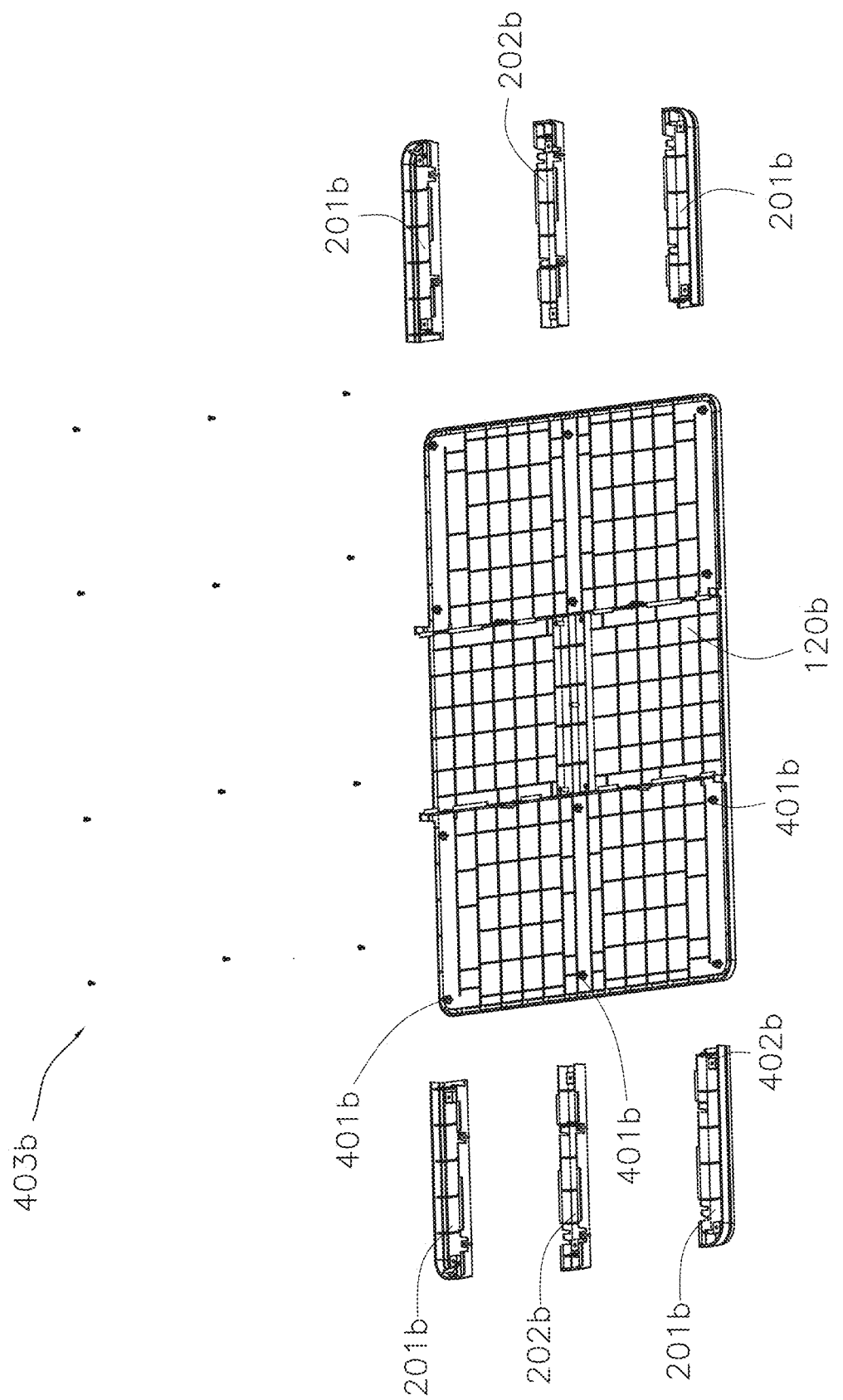
FIG. 22 illustrates an alternative configuration of a complementary conformation of the puzzle platform shown in FIG. 13.

The reinforcing assembly 200b and the puzzle plate 120b can be detachably assembled together using threads, snap-fit, friction fit, screws, rivets, or other similar complementary conformation 400b. Referring to FIG. 22, the complementary conformation comprises a plurality of first thread holes 401b provided on the puzzle plate 120b, a plurality of second thread holes 402b provided on the reinforcing assembly 200b and a plurality of fastening screws 403b passed through a corresponding first and second thread holes 401b, 402b for fixing the reinforcing assembly 200b on the puzzle plate 120b firmly.

The upper part 300b comprises a circular outer wall 35b surrounding the puzzle plate 120b, a circular inner wall 36b opposite to the outer wall 35b and extending upwardly from the puzzle plate 120b, an upper wall 37b connected with the outer and inner walls 35b, 36b and spaced apart from the puzzle plate 120b, and an upper space 38b surrounded by the upper wall 37b together with the outer and inner walls 35b, 36b for reducing the weight of the board assembly 2b. The inner wall 36b is integral with the puzzle plate 120b.

Figure 20:
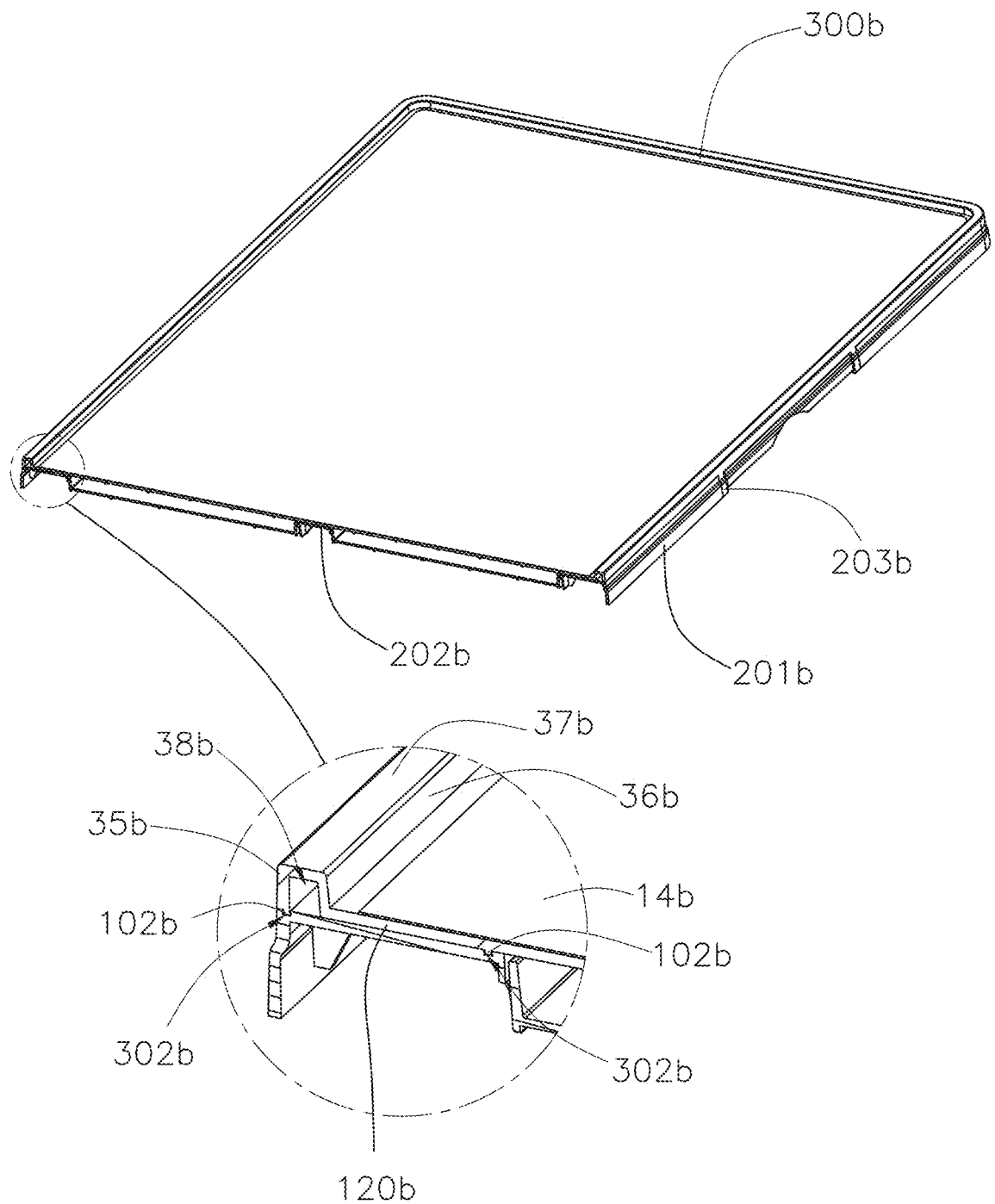
FIG. 20 is a cross-sectional view of the puzzle platform taken along line A-A of FIG. 13.
Figure 21:
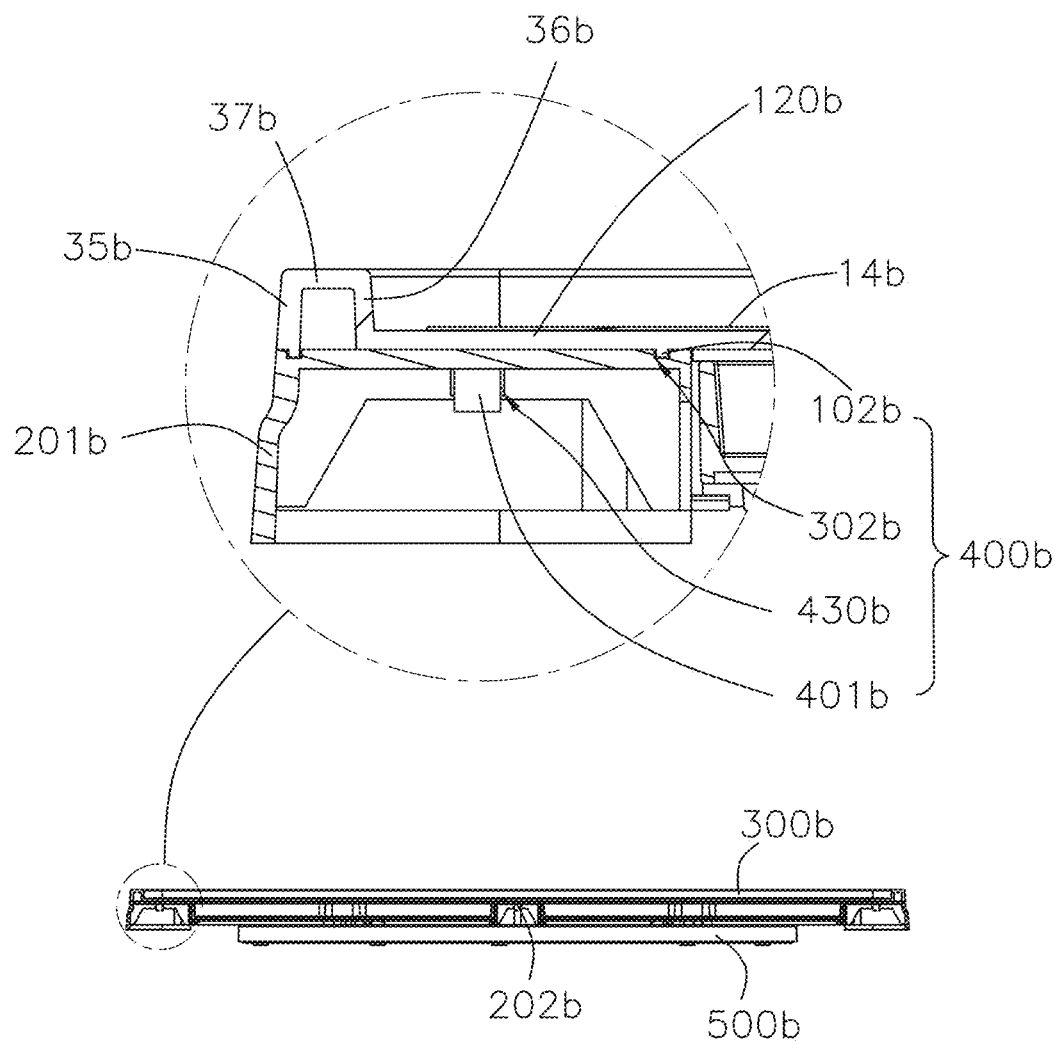
FIG. 21 is a cross-sectional view of the puzzle platform taken along line A-A of FIG. 13, but from another aspect.

Referring to FIGS. 20-21, the complementary conformation 400b further comprises a protruding portion 102b and a fixing groove 302b engaged with the protruding portion 102b. The protruding portion 102b is protruded from the puzzle plate 120b and the outer wall 35b of the upper part 300b. The fixing groove 302b is provided on the reinforcing assembly 200b and engaged with the protruding portion 102b for fixing the reinforcing assembly 200b on the puzzle board 100b firmly. Further, the protruding portion 102 may be also provided on the inner wall 36b. In an alternative embodiment, the positions of a protruding portion 102b and a fixing groove 302b can be interchanged.

The rotating assembly 500b comprises a first moving member 51b coupled at the board assembly 2b and a second moving member 52b rotatably coupled to the first moving member 51b, a plurality of fixing elements 53b for securely mounting the rotating assembly 500b to the board assembly 2b.

Figure 23:
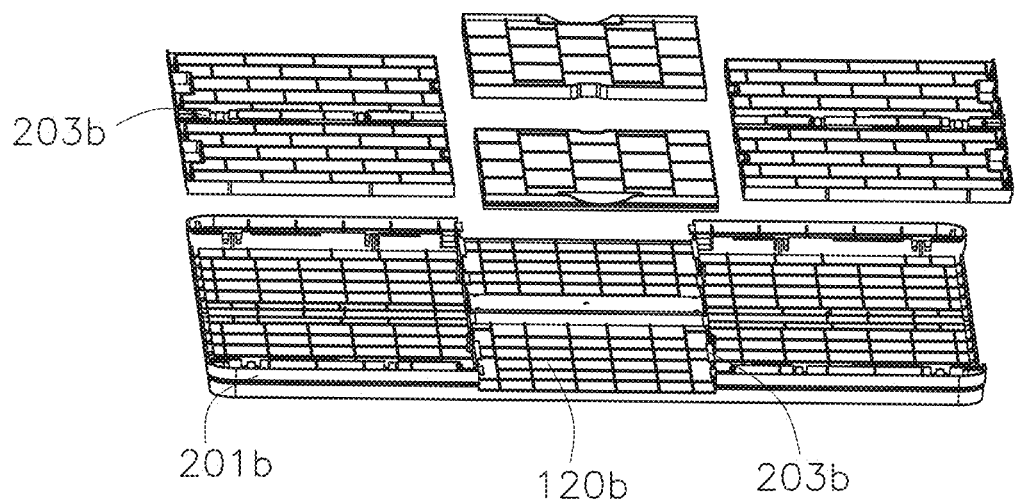
FIG. 23 illustrates an alternative configuration of the reinforcing assembly of the puzzle platform shown in FIG. 13.

In an alternative embodiment, referring to FIG. 23, a pair of dividing supporting walls 201b is detachably connected to the puzzle plate 120b, and a pair of main supporting walls 202b are integral with the puzzle plate 120b. The pair of inner supporting walls 203b are integral with the puzzle plate 120b.

Figure 24:
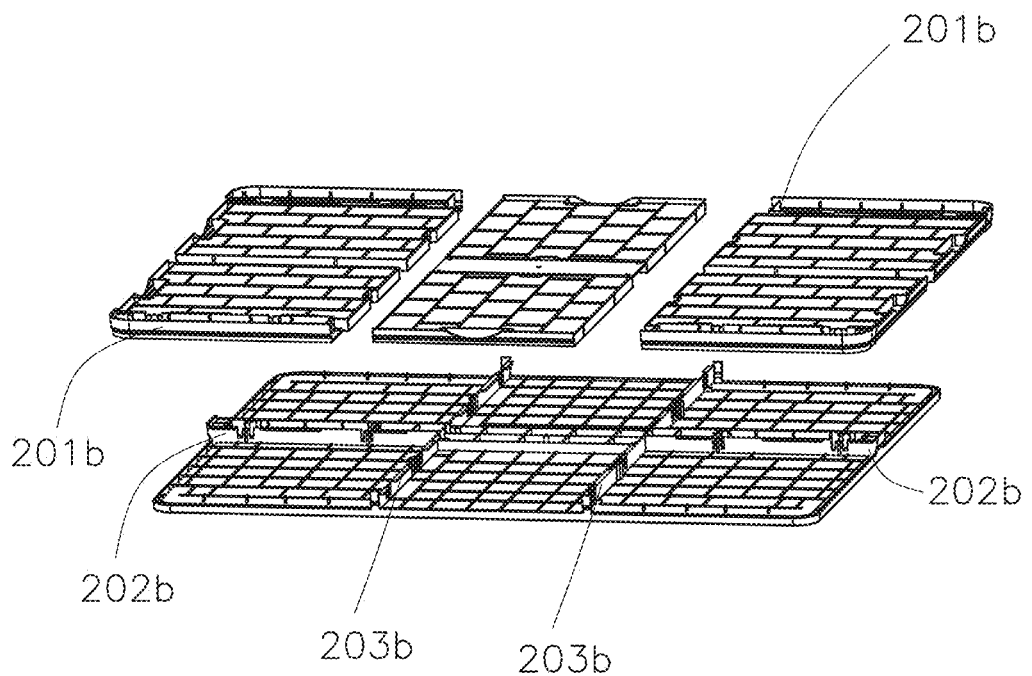
FIG. 24 illustrates a third mode of the reinforcing assembly of the puzzle platform shown in FIG. 13.

In a third embodiment, referring to FIG. 24, a pair of main supporting walls 201 is detachably connected to the puzzle board 100 and a pair of dividing supporting walls 202 are integral with the puzzle board 100. The pair of inner supporting walls 203b are integral with the puzzle plate 120b.

In a fourth embodiment, a pair of main supporting walls, a pair of dividing supporting walls, and a pair of inner supporting walls are all detachably connected to the puzzle board, respectively. This configuration results in a two-piece type assembly for the reinforcing assembly and the puzzle board.

Figure 15:
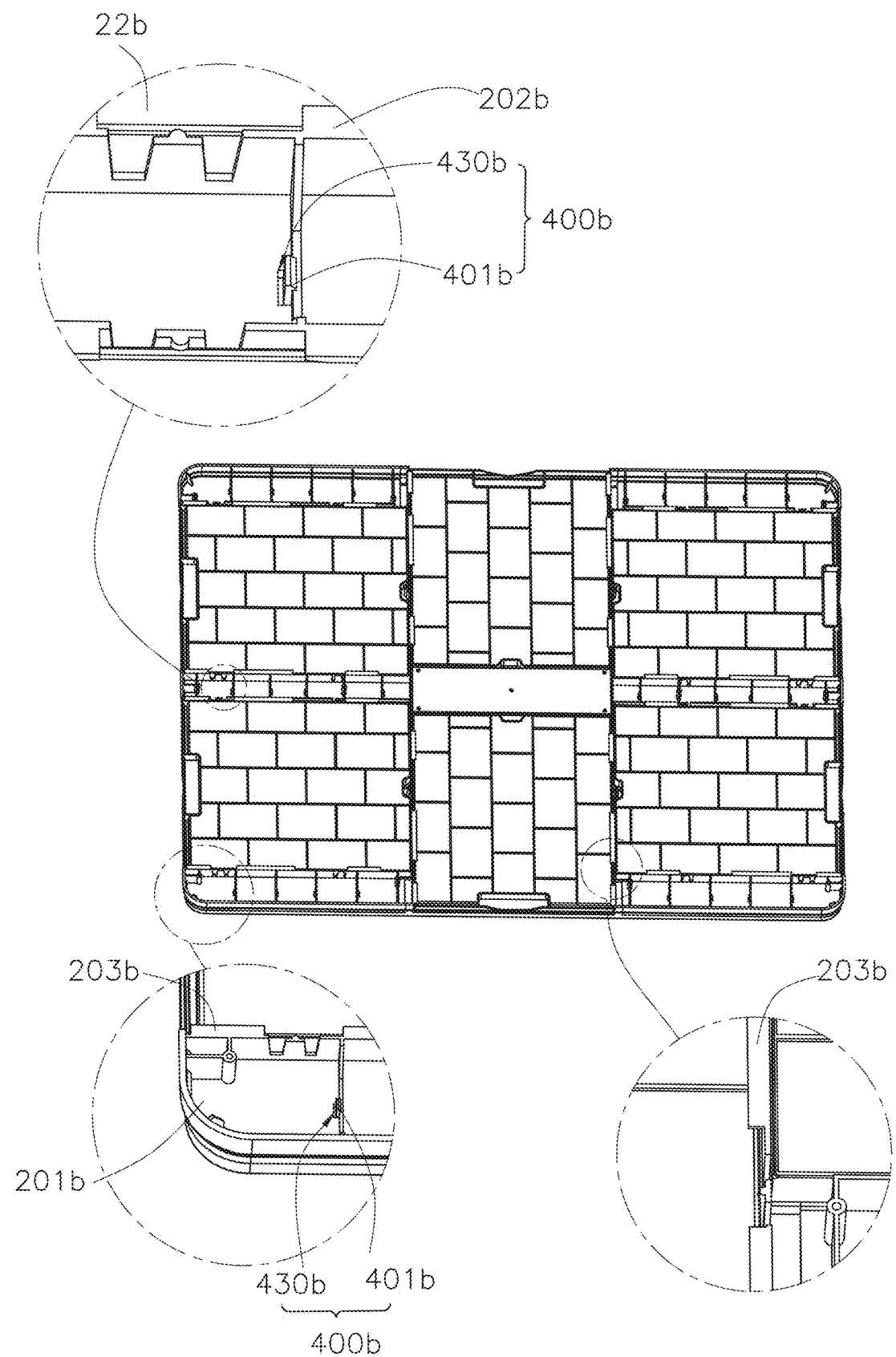
FIG. 15 is an illustrative isometric view of the puzzle platform shown in FIG. 13, with a rotating assembly removed.
Figure 16:
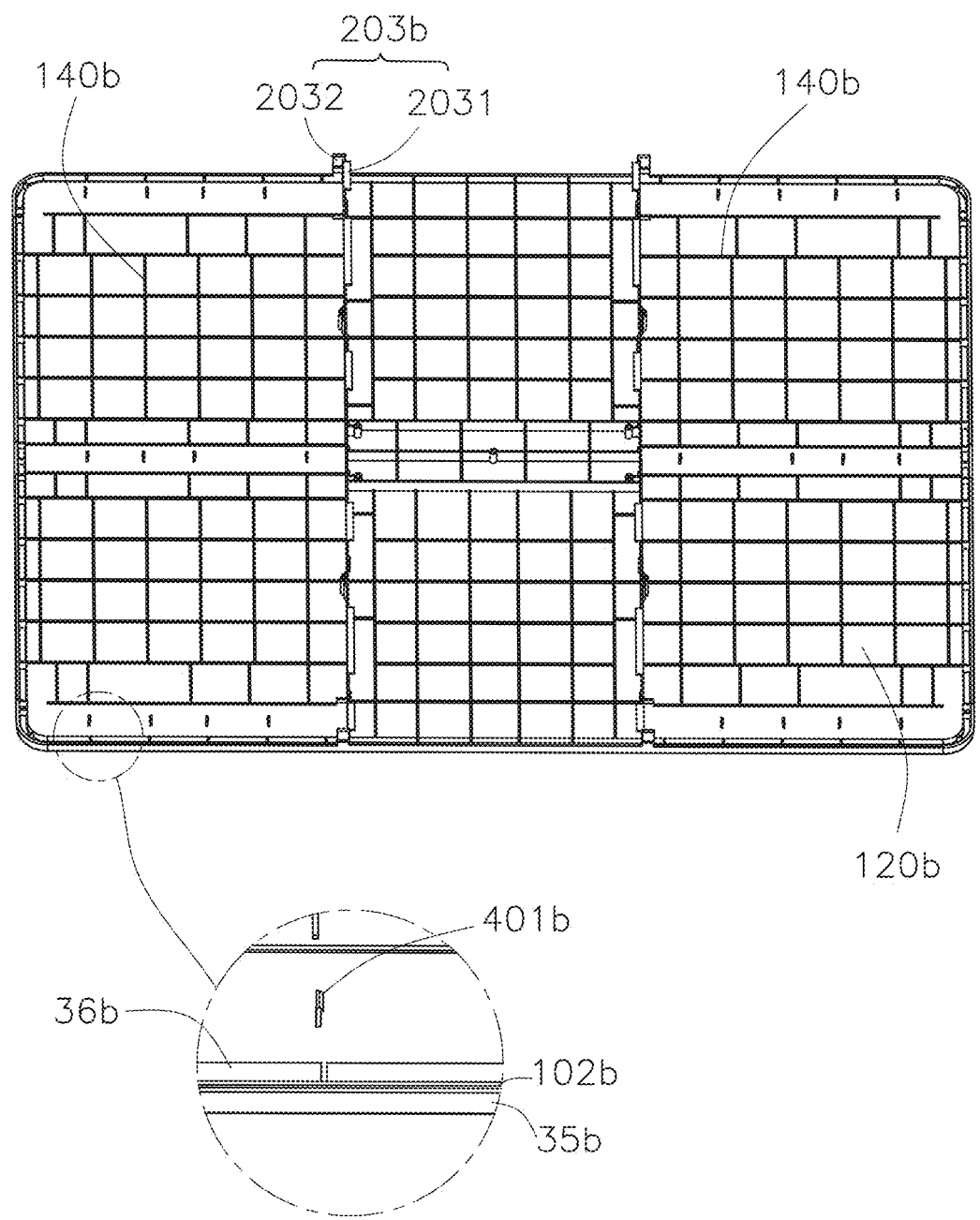
FIG. 16 is an illustrative isometric view of the puzzle platform shown in FIG. 13, a part of a reinforcing assembly, a base and the rotating assembly thereof being removed away.
Figure 17:
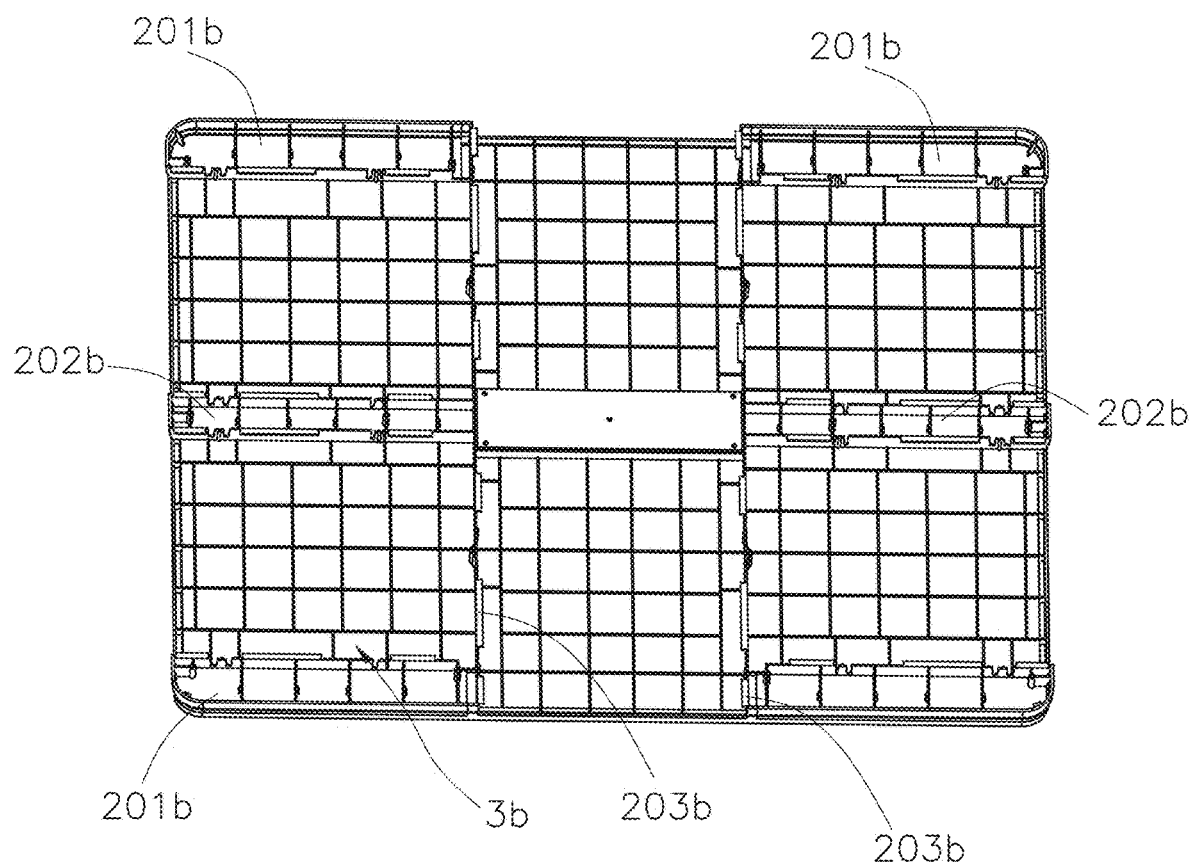
FIG. 17 is an illustrative isometric view of the puzzle platform shown in FIG. 13, the base and puzzle drawers thereof being removed away.
Figure 18:
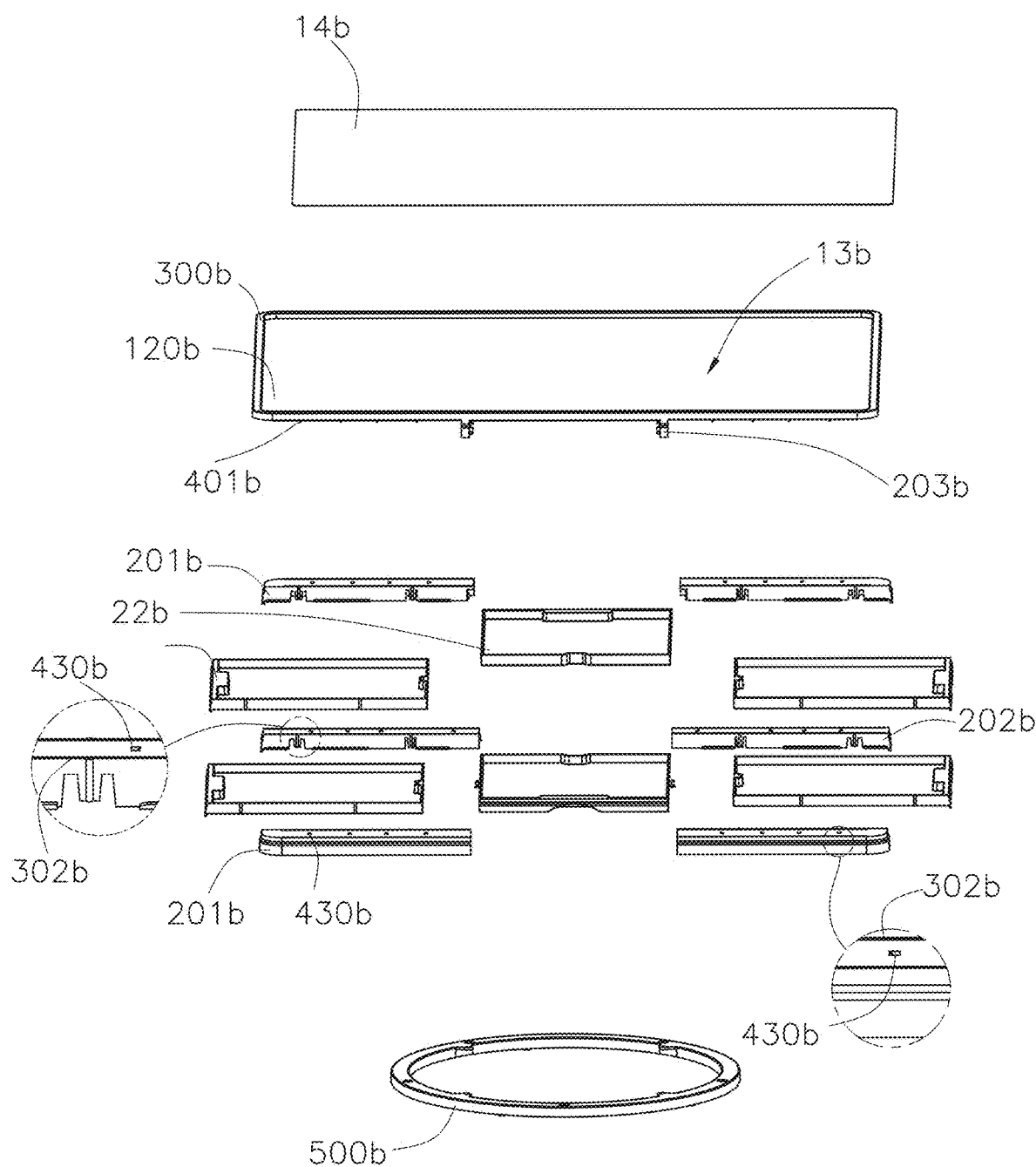
FIG. 18 is an exploded perspective view of the puzzle platform shown in FIG. 13.
Figure 19:
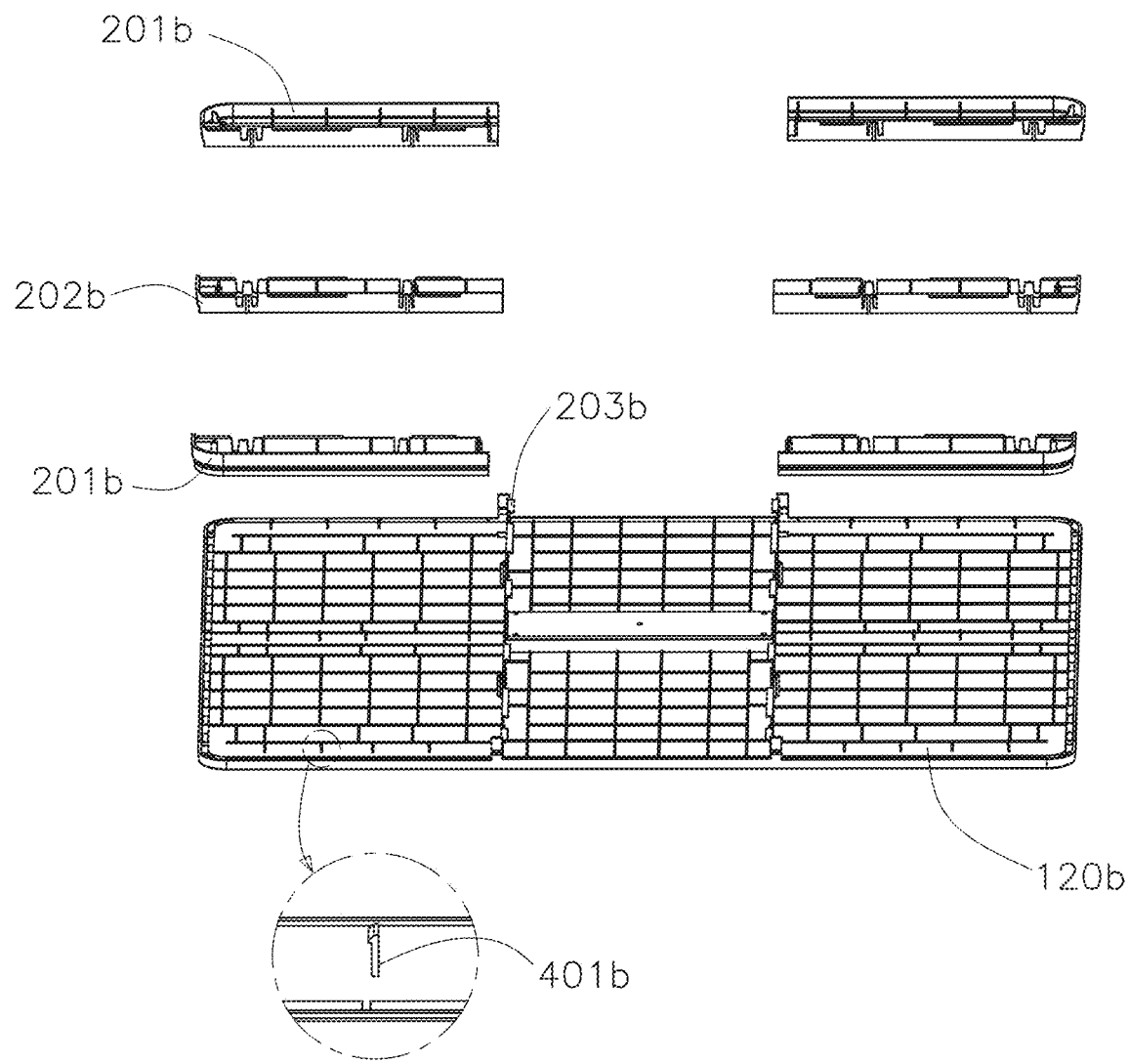
FIG. 19 is an exploded perspective view of the puzzle platform shown in FIG. 13, but from another aspect.

The reinforcing assembly 200b of the board assembly 2b further comprises a plurality of reinforcing ribs 140b with different patterns integrally extended from the puzzle plate 120b to solve the problem of the distortion or deformation of the board assembly 2b. Referring to FIG. 15, each of the fastening hooks 301 is passed through a corresponding fastening hole 430b and fixed on the reinforcing ribs 140b for fixing the reinforcing assembly 200b on the puzzle plate 120b firmly. In an alternative embodiment, the fastening hooks 301 may be directly fixed on a bottom surface of the main supporting walls 201b.

The upper part 300, the puzzle plate 120, and/or the reinforcing assembly 200 may be made of plastic, wood, or metal. When the reinforcing assembly 200 is made of plastic through molding, the upper part 300 can be integrated with the puzzle plate 120, forming a monolithic structure. In this embodiment, at least a portion of the reinforcing assembly 200 is detachably inserted into the puzzle plate 120. This design simplifies the assembly process, increases the service life of the device, enhances the support force applied to the puzzle plate, and significantly reduces material and assembly costs.

In another aspect, the puzzle plate 120 and the fixing portion 104 are integrated with the reinforcing assembly 200 to form a one-piece structure, thereby enhancing the mechanical strength of the board assembly 2 and reducing assembly costs.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A puzzle platform, comprising:
   a puzzle board comprising a plate portion and a fixing portion connecting to the plate portion;
   an upper part detachably connected to the puzzle board to form a workspace for placing a plurality of puzzle pieces;
   a reinforcing assembly supporting the puzzle board for forming a receiving space cooperatively with the puzzle board;
   at least two puzzle drawers retained in the receiving space, respectively; and
   a complementary conformation comprising a plurality of fastening holes provided on the fixing portion and a plurality of fastening hooks protruded from the upper part and located below an upper wall of the upper part for engaging with the fastening holes;
   wherein the upper part and the reinforcing assembly are positioned on opposite sides of the puzzle board; and
   wherein the reinforcing assembly is integral with the puzzle board to form a one-piece structure.

2. The puzzle platform as claimed in claim 1, wherein the upper part comprises
   a first extending wall connecting to the fixing portion;
   a second extending wall connecting to the fixing portion, spaced apart from the first extending wall; and
   a third extending wall connecting to the fixing portion and connected with the first extending wall and the second extending wall;
   wherein the plate portion, and the first, second and third extending walls form the workspace for containing the puzzle pieces.

3. The puzzle platform as claimed in claim 2, wherein the upper part is an integral unit.

4. The puzzle platform as claimed in claim 2, wherein the third extending wall is detachably connected to the first and second extending walls.

5. The puzzle platform as claimed in claim 2, wherein an outline of the upper part is rectangular with rounded corners.

6. The puzzle platform as claimed in claim 2, wherein the periphery of the reinforcing assembly comprises a connecting wall connected to the fixing portion, an outline of the upper part is substantially the same as that of the connecting wall.

7. The puzzle platform as claimed in claim 1, wherein the upper part comprises an outer wall mounted on the fixing portion, and an inner wall opposite to the outer wall, the upper wall connected with the outer and inner walls.

8. The puzzle platform as claimed in claim 7, wherein the upper part further comprises an upper space surrounded by the upper wall together with the outer and inner walls, the fastening hooks are spacedly extended from the upper wall and protruded from the upper space.

9. The puzzle platform as claimed in claim 7, wherein the upper part further comprises an upper space surrounded by the upper wall together with the outer and inner walls, and a plurality of reinforcing parts provided in the upper space for preventing the distortion or deformation of the upper part.

10. The puzzle platform as claimed in claim 7, wherein a joining portion of the upper wall and the outer wall is curved.

11. The puzzle platform as claimed in claim 1, wherein the periphery of the reinforcing assembly comprises a connecting wall connected to the puzzle board, a step portion extending downwardly from the connecting wall along a direction away from the center of the puzzle board, and a supporting wall extending downwardly from the step portion.

12. The puzzle platform as claimed in claim 1, wherein the reinforcing assembly comprises:
    a first main supporting wall integrally extended downwardly from the puzzle board;
    a second main supporting wall integrally extended downwardly from the puzzle board; and
    a first dividing supporting wall integrally extended downwardly from the puzzle board and disposed between the first and second main supporting walls;
    wherein the puzzle board, the first dividing supporting wall, and the first and second main supporting walls form a one-piece structure, and the first dividing supporting wall is cooperated with the first main supporting wall and the second main supporting wall for securing the puzzle drawers.

13. The puzzle platform as claimed in claim 12, wherein the reinforcing assembly further comprises a first inner supporting wall integrally extended downwardly from the puzzle board and connected with the first main supporting wall and the second main supporting wall, and the first inner supporting wall is also connected with the first dividing supporting wall for forming a one-piece structure cooperated with the puzzle board, the first dividing supporting wall, and the first and second main supporting walls.

14. The puzzle platform as claimed in claim 12, wherein the first main supporting wall comprises a first hollow space, and the reinforcing assembly further comprises reinforcing ribs integrally extended from the puzzle plate and provided in the first hollow space.

15. The puzzle platform as claimed in claim 1, wherein the reinforcing assembly further comprises a coupling hole, and the puzzle platform further comprises a rotating assembly having a fixing hole and a fixing screw, the fixing screw is passed through the fixing hole and the coupling hole for securing the rotating assembly onto the board assembly.

16. A puzzle platform, comprising:
    a puzzle board;
    a reinforcing assembly supporting the puzzle board and integral with the puzzle board to form a one-piece structure;
    a receiving space formed by the puzzle board cooperatively with the reinforcing assembly; and
    at least two puzzle drawers retained in the receiving space, respectively;
    wherein the reinforcing assembly comprises at least one limiting bar, and a corresponding puzzle drawer comprises at least one limiting groove matching with the limiting bar;

wherein the reinforcing assembly further comprises a plurality of drawer holders to retain the puzzle drawers in the receiving space; each drawer holder comprises a reinforcing wall integrally extending from the puzzle board and a bending portion extending integrally and bendably from the reinforcing wall towards the receiving space.

17. The puzzle platform as claimed in claim 16, wherein the reinforcing assembly further comprises a plurality of reinforcing ribs with different patterns integrally extended from the puzzle board and positioned in the receiving space.

18. The puzzle platform as claimed in claim 16, wherein the reinforcing assembly further comprises a plurality of limiting openings adjacent to a corresponding limiting bar for providing the limiting bars with elasticity.

19. The puzzle platform, as claimed in claim 16, further comprising an upper part detachably connected to the puzzle board to form a workspace for placing a plurality of puzzle pieces.

20. The puzzle platform, as claimed in claim 16, further comprising a rotating assembly detachably coupled with the reinforcing assembly; the rotating assembly comprises at least one fixing element for mounting the rotating assembly to the reinforcing assembly; the fixing element comprises a fixing screw and a fixing hole engaged with a corresponding fixing screw to secure the rotating assembly to the reinforcing assembly; the reinforcing assembly further comprises at least one coupling portion that integrally extend from the puzzle board and comprises at least one coupling hole cooperated with the fixing hole to be engaged with the fixing screws.

21. The puzzle platform as claimed in claim 20, wherein the reinforcing assembly comprises:
   a first main supporting wall integrally extended downwardly from the puzzle board;
   a second main supporting wall integrally extended downwardly from the puzzle board; and
   a dividing supporting wall integrally extended downwardly from the puzzle board and disposed between the first and second main supporting walls;
   wherein the puzzle board, the dividing supporting wall, and the first and second main supporting walls form a one-piece structure.

22. The puzzle platform as claimed in claim 21, wherein the coupling portion is provided on the dividing supporting wall; the dividing supporting wall comprises a second hollow space and the coupling portion is provided in the second hollow space.

23. A puzzle platform, comprising:
   a puzzle board;
   a reinforcing assembly supporting the puzzle board and integral with the puzzle board to form a one-piece structure;
   a rotating assembly coupled with the reinforcing assembly;
   a receiving space formed by the puzzle board in cooperation with the reinforcing assembly; and
   at least two puzzle drawers retained in the receiving space, respectively;
   wherein the puzzle platform further comprises a fixing element; the fixing element comprises a fixing screw and a fixing hole engaged with the fixing screw to secure the rotating assembly to the reinforcing assembly;
   wherein the reinforcing assembly comprises a coupling portion that integrally extends from the puzzle board and comprises a coupling hole; and
   wherein the coupling hole is cooperated with the fixing hole to be engaged with the fixing screw.

24. The puzzle platform as claimed in claim 23, wherein the reinforcing assembly comprises:
   a first main supporting wall integrally extended downwardly from the puzzle board;
   a second main supporting wall integrally extended downwardly from the puzzle board; and
   a dividing supporting wall integrally extended downwardly from the puzzle board and disposed between the first supporting wall and the second main supporting wall;
   wherein the puzzle board, the dividing supporting wall, the first main supporting wall, and the second main supporting wall form a one-piece structure.

25. The puzzle platform as claimed in claim 24, wherein the coupling portion is provided on the dividing supporting wall; the dividing supporting wall comprises a second hollow space.

26. The puzzle platform as claimed in claim 24, wherein the reinforcing assembly further comprises a bottom portion distant from the puzzle board, and at least part of the rotating assembly is closer to the puzzle board than the bottom portion.

27. The puzzle platform as claimed in claim 26, wherein the fixing element further comprises a fixing surface; the fixing surface is closer to the puzzle board than the bottom portion.

28. The puzzle platform as claimed in claim 27, wherein the coupling portion is located between a pair of puzzle drawers.

\* \* \* \* \*